US009667821B2

(12) United States Patent
Matsunami

(10) Patent No.: US 9,667,821 B2
(45) Date of Patent: May 30, 2017

(54) IMAGE FORMATION SYSTEM AND CONNECTION UNIT

(71) Applicant: SEIKO EPSON CORPORATION, Tokyo (JP)

(72) Inventor: Toshinori Matsunami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/065,690

(22) Filed: Mar. 9, 2016

(65) Prior Publication Data

US 2016/0269581 A1 Sep. 15, 2016

(30) Foreign Application Priority Data

Mar. 12, 2015 (JP) ................. 2015-050050

(51) Int. Cl.
*H04N 1/04* (2006.01)
*H04N 1/00* (2006.01)

(52) U.S. Cl.
CPC ..... *H04N 1/00907* (2013.01); *H04N 1/00557* (2013.01)

(58) Field of Classification Search
CPC ............. G06K 7/0008; G06K 7/10356; G06K 7/10158; G06K 7/10178; G06K 7/10316; G06K 7/10346; G06K 2017/0051; G06K 7/10009; G06K 7/10079; G06K 7/10128; G06K 9/00791; G06K 9/00832; G01K 11/006
USPC ...... 235/439, 379, 492; 455/78, 552.1, 41.2, 455/456.1, 83; 375/219, 220, 349; 358/1.15
See application file for complete search history.

(56) References Cited

U.S. PATENT DOCUMENTS

| 6,417,937 | B1 * | 7/2002 | Batten ...................... H04N 1/10 358/475 |
| 6,903,835 | B1 * | 6/2005 | Naoi .................. H04N 1/00885 358/1.15 |
| 7,103,760 | B1 * | 9/2006 | Billington ............... G06F 1/266 399/107 |
| 8,046,702 | B2 * | 10/2011 | Endoh ................ G03G 15/5016 715/204 |
| 2003/0206318 | A1 | 11/2003 | Breslawski et al. |
| 2004/0044709 | A1 * | 3/2004 | Cabrera ............. H04B 10/1149 708/191 |
| 2005/0104867 | A1 * | 5/2005 | Westerman ........... G06F 3/0235 345/173 |

(Continued)

FOREIGN PATENT DOCUMENTS

| JP | 2003-333278 | 11/2003 |
| JP | 2006-254212 | 9/2006 |
| JP | 2011-120139 | 6/2011 |

*Primary Examiner* — Negussie Worku
(74) *Attorney, Agent, or Firm* — Workman Nydegger

(57) ABSTRACT

An image reading system is configured by integrally assembling a flatbed scanner apparatus and a sheet-fed scanner apparatus using a separate component, a connection unit. A circuit substrate for a power source system and a communication system is disposed in the connection unit. The circuit substrate includes a power source input connector to which power is input, a power divider that divides power input from the power source input connector into plural types, and a power source output connector and a communication connector that output each power divided by the power divider to each scanner apparatus.

15 Claims, 11 Drawing Sheets

(56) References Cited

U.S. PATENT DOCUMENTS

| | | | |
|---|---|---|---|
| 2006/0077082 A1* | 4/2006 | Shanks | G06K 7/0008 341/120 |
| 2006/0203306 A1* | 9/2006 | Hoshi | H04N 1/00002 358/497 |
| 2007/0285678 A1* | 12/2007 | Matsunami | B41J 3/46 358/1.1 |
| 2007/0285709 A1* | 12/2007 | Yamasaki | G06F 3/1208 358/1.15 |
| 2008/0266614 A1* | 10/2008 | Doan | H04N 1/0057 358/474 |
| 2008/0278774 A1* | 11/2008 | Enami | H04N 1/00681 358/475 |
| 2009/0021798 A1* | 1/2009 | Abahri | H04N 1/195 358/474 |
| 2009/0051497 A1* | 2/2009 | Miyaso | B41J 3/50 340/10.4 |

* cited by examiner

IMAGE FORMATION SYSTEM AND CONNECTION UNIT

BACKGROUND

1. Technical Field

The present invention relates to an image formation system and to a connection unit, the image formation system including an image formation apparatus, such as an image reading apparatus reading a document to form image data, in plural quantities and the plurality of image formation apparatuses being integrally assembled by the connection unit.

2. Related Art

In the related art, an image reading apparatus such as a scanner apparatus is known as an example of an image formation apparatus. As this type of image reading apparatus, known are a flatbed scanner apparatus and a sheet-fed scanner apparatus. The flatbed scanner apparatus reads an image of a document using a reader such as a line sensor while moving a carriage along a glass plate below the glass plate of a document stand on which the document pressed by a document stand cover is mounted.

The sheet-fed scanner apparatus transports plural sheets of documents set in an automatic document transport device (hereinafter, referred to as "auto document feeder (ADF) device") one sheet at a time in order and reads an image of a document using a reader such as a line sensor arranged midway of a transport path of the document.

The flatbed scanner apparatus can read an image of a little thick document such as a book or a passport. Meanwhile, the sheet-fed scanner apparatus cannot read a thick document but can read images of a plurality of documents by automatically transporting the documents without a need to set the documents one by one as in the flatbed type. Thus, the flatbed scanner apparatus and the sheet-fed scanner apparatus are appropriately used according to the respective purposes thereof. In order to realize the purposes of both apparatuses, there is also known an image reading apparatus having functions of both of a flatbed scanner unit and a sheet-fed scanner unit (for example, JP-A-2011-120139 or the like).

In, for example, JP-A-2003-333278 and JP-A-2006-254212, there is disclosed an image reading apparatus in which the flatbed scanner apparatus and the sheet-fed scanner apparatus are integrally docked in an attachably detachable manner.

In JP-A-2003-333278, there is disclosed a combination scanner using both platen scanning (flatbed scanning) and sheet-supplied scanning (sheet-fed scanning).

In the combination scanner, a platen unit can be docked in an attachably detachable manner on a sheet-supplied scanning unit that includes an auto feeder mechanism.

In JP-A-2006-254212, there is disclosed a configuration improving workability in attachment and detachment of two scanners in an electronic apparatus that includes two scanners of a sheet-through scanner and a flatbed scanner in a separably connectable manner. In the electronic apparatus, the sheet-through scanner is fixed to the flatbed scanner by hooking a hook into a recessed portion at a position where a contact substrate is exposed by sliding the sheet-through scanner. In conjunction with the operation of hooking the hook at the time of fixing, a contact member is pushed toward the sheet-through scanner by a lever, and this allows contact substrates of both scanners to be electrically connected.

In the image reading apparatuses disclosed in JP-A-2003-333278 and in JP-A-2006-254212, both of the scanner apparatuses are required to incorporate a docking mechanism having a comparatively complicated structure that includes an electrical connection mechanism providing an electrical connection between both scanner apparatuses when the two scanner apparatuses are docked. In addition, makers have to individually manufacture a scanner apparatus with an attached docking mechanism, a flatbed scanner apparatus, and a sheet-fed scanner apparatus. Thus, it is considered that an image reading system is configured by using an existing single-functioned flatbed scanner apparatus and a sheet-fed scanner apparatus, for example, by integrally assembling a plurality of image reading apparatuses (scanner apparatuses) using a separate component, a connection unit such as a docking member. An image reading system is not limited to a combination of a plurality of scanner apparatuses having different functions. According to purposes or needs, it is also considered that an image reading system is configured by, for example, integrally assembling a plurality of flatbed scanner apparatuses using a connection unit or by integrally assembling a plurality of sheet-fed scanner apparatuses using a connection unit.

However, if an image reading system is configured as above, a power source system component such as a power source adapter is required to be separately connected to each image reading apparatus in order to supply power source power to the plurality of image reading apparatuses. Thus, even though the image reading apparatuses are integrally assembled as one image reading system, a problem arises in that a power source system component such as a power source adapter is required in larger quantities than is required in the image reading apparatuses disclosed in JP-A-2003-333278 and in JP-A-2006-254212. This leads to a need for preparation of a plug outlet (plug receiver) in plural quantities for plugging plugs of the power source system components connected to the image reading system into an alternating current power source and also leads to likelihood of obstruction by cables such as a power source cable and a communication cable exposed around the image reading system.

The problems are not limited to an image formation apparatus such as an image reading apparatus reading an image of a document and forming data of the image. Substantially the same problem also exists in a case where an image formation system is configured by integrally assembling, using a connection unit, a plurality of image formation apparatuses including at least one image formation apparatus such as a printing apparatus forming an image by printing on a medium such as a paper.

SUMMARY

An advantage of some aspects of the invention is provision of an image formation system and a connection unit capable of reducing a necessary number of power source system components such as a power source adapter in the image formation system configured by integrally assembling a plurality of image formation apparatuses using the connection unit.

Hereinafter, means of the invention and operation effects thereof will be described.

According to an aspect of the invention, there is provided an image formation system that is configured by integrally assembling a plurality of image formation apparatuses using a connection unit, the system including the plurality of image formation apparatuses, and the connection unit, in which the connection unit includes a power receiver to which power is input, a power divider that divides power input from the power receiver into plural types, and a plurality of power outputters that outputs each power divided by the power divider to the plurality of image formation apparatuses.

According to this configuration, the plurality of image formation apparatuses is integrally assembled by the connection unit. In this assembly state, power that is input from the power receiver disposed in the connection unit is divided by the power divider, and each divided power is output from the plurality of power outputters disposed in the connection unit to the plurality of image formation apparatuses. Thus, since a power source system component such as a power source adapter is not required to be individually connected to the plurality of image formation apparatuses, the number of power source system components such as a power source adapter necessary for supply of power to the image formation system can be decreased.

In the image formation system, it is preferable that the power receiver receives power through a power source adapter that converts an alternating current input from a power source into a direct current and outputs the direct current.

In this case, the power receiver receives power through the power source adapter. Thus, the power receiver receives direct current power into which an alternating current from a power source is converted through the power source adapter. The received direct current power can be divided by the power divider, and each divided power can be supplied from the plurality of power outputters to the plurality of image formation apparatuses. Thus, the number of power source adapters required in the image formation system can be decreased relative to the number of image formation apparatuses.

In the image formation system, it is preferable that the plurality of power outputters includes a first power outputter and a second power outputter, the first power outputter includes a first connector that is configured of either a communication connector having a power supply function or a power source output connector, and the second power outputter includes a second connector that is configured of either a communication connector having a power supply function or a power source output connector.

In this case, each power divided by the power divider is either supplied to the image formation apparatus through a communication cable connected to a communication connector or is supplied to the image formation apparatus through a power source cable connected to a power source output connector. Thus, it is not necessary to connect a power source system component such as a power source adapter to the image formation apparatus. Therefore, power can be supplied to the plurality of image formation apparatuses if a communication cable or a power source cable is prepared, and the number of power source system components required in the image formation system can be decreased relative to the number of image formation apparatuses.

In the image formation system, it is preferable that the first connector is a communication connector, and the second connector is a power source output connector.

In this case, one image formation apparatus of the plurality of image formation apparatuses constituting the image formation system is supplied with power through a communication cable connected to a communication connector, and the other image formation apparatus is supplied with power through a power source cable connected to a power source output connector. If, for example, a communication cable is connected between the plurality of image formation apparatuses and the connection unit, the presence of the image formation apparatus to which power is supplied through a communication cable allows a decrease in the necessary number of power source system components relative to the number of image formation apparatuses and, in addition, allows a decrease in the necessary number of cables compared with a configuration in which a power source cable and a communication cable are individually connected to the plurality of image formation apparatuses.

In the image formation system, it is preferable that the first connector is a first communication connector that is connected to a first image formation apparatus through a communication cable, and the connection unit includes a host communication connector that is communicably connectable to a host apparatus, the first communication connector, and a second communication connector that is connected through a communication cable to a second image formation apparatus to which the power source output connector is connected through a power source cable.

In this case, one of the power divided by the power divider is supplied to the first image formation apparatus through a communication cable connected to the first communication connector, and the other divided power is supplied to the second image formation apparatus through a power source cable connected to a power source connector. The host apparatus that is connected to the host communication connector of the connection unit through a communication cable can communicate with the first image formation apparatus through a communication cable connected to the first communication connector included in the connection unit and can communicate with the second image formation apparatus through a communication cable connected to the second communication connector.

In the image formation system, it is preferable that the first communication connector supplies power of a predetermined value or more to a unit connected thereto, and the second communication connector supplies power less than the predetermined value to a unit connected thereto.

In this case, even if the first communication connector and the second communication connector are incorrectly connected at a time of connecting a communication cable between the connection unit and the image formation apparatuses, the erroneous connection can be found comparatively easily since power is not supplied. In addition, an overcurrent protector circuit that prevents an overcurrent at a time of occurrence of a short circuit (short) from any cause in the second image formation apparatus connected to the second communication connector is not required to be disposed at least on the second communication connector side of the connection unit.

In the image formation system, it is preferable that the first connector is a power source output connector, and the second connector is a power source output connector.

In this case, the plurality of image formation apparatuses constituting the image formation system is supplied with each power through power source cables respectively connected to two power source output connectors of the connection unit. Thus, the necessary number of power source system components can be decreased relative to the number of image formation apparatuses, and the necessary number of cables can be decreased compared with a configuration in which a power source cable is individually connected to the plurality of image formation apparatuses. In addition, even if the plurality of image formation apparatuses requires comparatively large power, each image formation apparatus can be supplied with necessary power.

In the image formation system, it is preferable that the connection unit includes a circuit substrate, a power source connector group of a power source system including each connector of the power receiver and the power outputter and a communication connector group of a communication system are arranged as separate groups in a substrate constituting the circuit substrate, and each power source line connected to the power source connectors and to the communication connectors and each communication line connected to the communication connectors are arranged along non-intersecting paths in the substrate.

In this case, since the power source connector group and the communication connector group are arranged as separate groups in the substrate, each power source line connected to the power source connectors and to the communication connectors can be arranged to have no intersection with each communication line connected to the communication connectors. Thus, noise from the power source lines is not likely to be superimposed on a signal or data transmitted through the communication lines, and communication can be performed with high reliability.

In the image formation system, it is preferable that a step down circuit that steps down a power source voltage input from a power source input connector of the power source connectors to a predetermined voltage and outputs the stepped down voltage to two or more communication connectors to which the plurality of image formation apparatuses is connected and a communication controller circuit that controls communication performed through the communication connectors are mounted in the substrate constituting the circuit substrate.

In this case, the plurality of image formation apparatuses can be supplied with a necessary voltage through each communication connector, and communication can be performed with the plurality of image formation apparatuses through each communication connector.

In the image formation system, it is preferable that two power source lines that connect output terminals of the step down circuit and two communication connectors positioned at both ends of the communication connector group and a plurality of communication lines that connects the communication controller circuit and the communication connector group are arranged in the substrate, and the two power source lines extending from the step down circuit are arranged along paths that surround the communication controller circuit and the plurality of communication lines on at least two sides.

In this case, the two power source lines extending from output terminals of the step down circuit to the two communication connectors positioned at both ends of the communication connector group are arranged along paths surrounding the communication controller circuit and the communication lines on at least two sides. Thus, the communication lines connected to the communication connectors can be arranged to have no intersection with the power source lines connected to the communication connectors. As a consequence, superimposition of noise from the power source lines on a signal or data transmitted through the communication lines is easily avoided.

In the image formation system, it is preferable that the communication lines are formed in the substrate along wiring paths that are surrounded by a ground layer formed in the substrate on at least three sides.

In this case, since the communication lines are surrounded by the ground layer on at least three sides, noise is not likely to be superimposed on a signal or data transmitted through the communication lines, and communication can be performed with high reliability.

In the image formation system, it is preferable that a substrate constituting a circuit substrate is arranged in the connection unit at a position lined up with the first image formation apparatus in a direction intersecting a height direction of the first image formation apparatus attached to the connection unit and is arranged in a direction in which a mounting face thereof intersects the height direction, the substrate has a predetermined plate shape surrounded by a plurality of sides, the second communication connector is arranged on a first side that is positioned on an opposite side of the substrate from the first image formation apparatus, and the first communication connector is arranged on a second side that intersects the first side in the substrate and arranged in a direction in which a direction of connection thereto intersects a direction of connection to the second communication connector.

In this case, the second connector is arranged on the first side that is positioned on the opposite side of the substrate from the position to which the first image formation apparatus is attached. Meanwhile, the first connector is arranged on the second side intersecting the first side and in a direction in which the direction of connection thereof intersects the direction of connection to the second connector. Thus, the first image formation apparatus can be arranged at a position moved closer to the circuit substrate in the connection unit than in a configuration in which the first connector is arranged on a first image formation apparatus side (third side) of the substrate, and the size of the image formation system can be reduced in the direction of the moving of the position by an amount corresponding to the moving of the position.

In the image formation system, it is preferable that the power outputter connected to the second image formation apparatus through a power source cable and the second communication connector connected to the second image formation apparatus through a communication cable are adjacently arranged in the connection unit.

In this case, a power source cable connected to the power outputter and a communication cable connected to the second communication connector are easily tied since the power outputter and the second communication connector are adjacently arranged in the substrate. The power source cable and the communication cable can be tied comparatively easily by, for example, a clip.

In the image formation system, it is preferable that the plurality of image formation apparatuses includes a flatbed image reading apparatus and a sheet-fed image reading apparatus.

In this case, each power divided by a power source divider of a docking unit can be supplied to a first flatbed image reading apparatus and to a second sheet-fed image reading apparatus. In addition, the plurality of image reading apparatuses can be appropriately used according to needs by reading a thick reading target such as a passport using the flatbed image reading apparatus and continuously reading plural sheets of documents using the sheet-fed image reading apparatus.

According to another aspect of the invention, there is provided a connection unit for the image formation system, the unit including a docking unit to which a plurality of image formation apparatuses is attached, a power receiver to which power is input, a power divider that divides power input from the power receiver into plural types, and a plurality of power outputters that outputs each power divided by the power divider to the plurality of image formation apparatuses.

According to this configuration, the plurality of image formation apparatuses is integrally assembled by the connection unit. In this assembly state, power that is input from the power receiver is divided by the power divider, and each divided power is output from the plurality of power outputters to the plurality of image formation apparatuses. Thus, a power source system component such as a power source adapter is not required to be individually connected to the plurality of image formation apparatuses, and the number of power source system components such as a power source adapter required in the image formation system can be decreased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment in which an image formation system is realized will be described with reference to the drawings.

Figure 1:
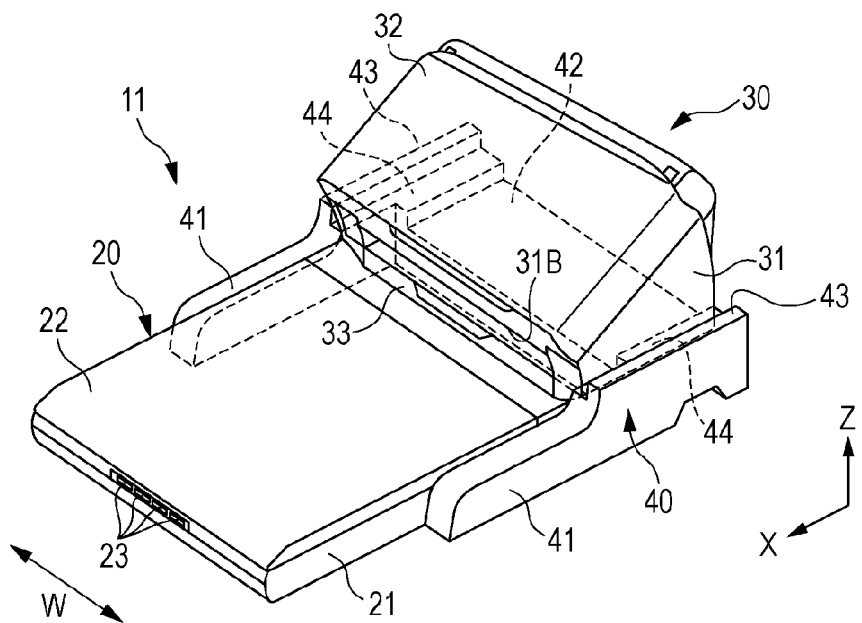
FIG. 1 is a perspective view of an image reading system in one embodiment.

As illustrated in FIG. 1, an image reading system 11 as an example of the image formation system includes a flatbed (document mounting) scanner apparatus 20, a sheet-fed (document transporting) scanner apparatus 30, and a connection unit 40 (docking station) connecting both of the scanner apparatuses 20 and 30 to one unit. The image reading system 11 is configured by integrally assembling both of the scanner apparatuses 20 and 30 using the connection unit 40. In the description below, the flatbed scanner apparatus 20 will be referred to as "first scanner apparatus 20", and the sheet-fed scanner apparatus 30 will be referred to as "second scanner apparatus 30". In the present embodiment, the first scanner apparatus 20 constitutes an example of "first image reading apparatus", and the second scanner apparatus 30 constitutes an example of "second image reading apparatus".

The connection unit 40 includes a docking unit 40A forming a main body made of, for example, resin. The docking unit 40A includes a pair of extending portions 41 extending parallel to each other at an interval slightly larger than the width in the short direction of the first scanner apparatus 20 and a supporting portion 42 shaped as a hollow bottomed quadrangular plate and connecting a base portion of the pair of extending portions 41 in the width direction. The first scanner apparatus 20 is attached to the connection unit 40 in a state where a part in the longitudinal direction (approximately half on a back portion side) of a main body 21 is inserted between the pair of extending portions 41, and the second scanner apparatus 30 is attached to the connection unit 40 in a state mounted on the supporting portion 42. The direction of the interval between the pair of extending portions 41 will be referred to as "width direction W", the longitudinal direction of the image reading system 11 matching the direction in which the pair of extending portions 41 extends will be referred to as "X direction", and a direction orthogonal with respect to both of the width direction W and the X direction will be referred to as "height direction Z". In each of the scanner apparatuses 20 and 30, the width direction W is a main-scanning direction, and the X direction is a sub-scanning direction.

Figure 2:
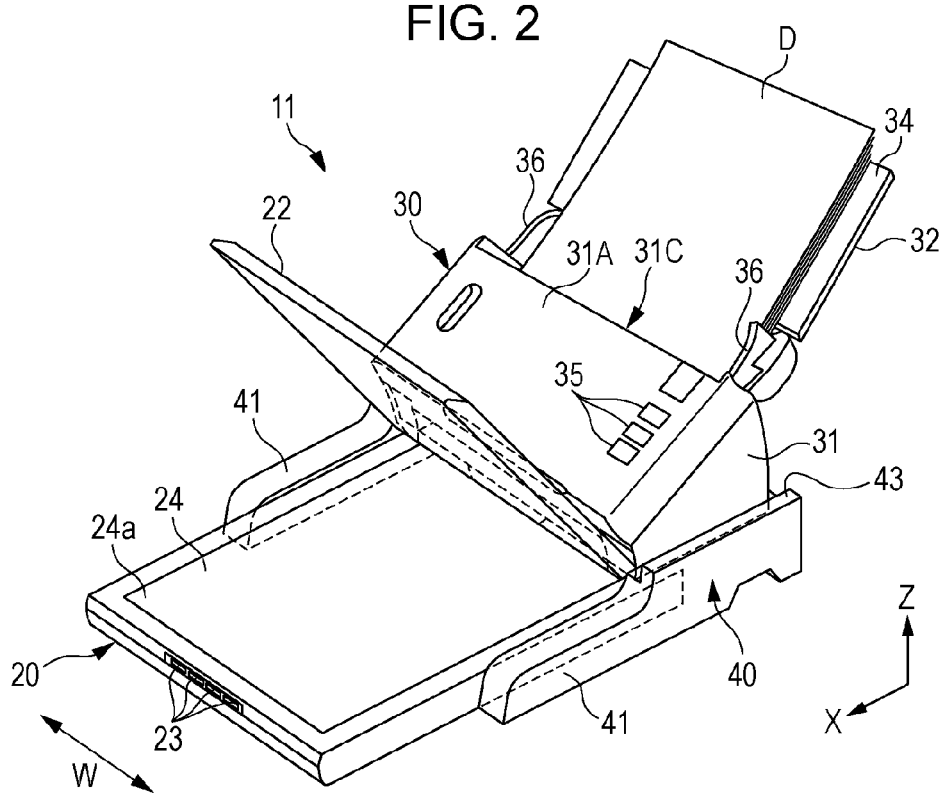
FIG. 2 is a perspective view illustrating a state of use of the image reading system.

As illustrated in FIG. 1 and FIG. 2, the pair of extending portions 41 has a part near a tip end portion (left end portion in FIG. 1) thereof extending in the X direction with a constant height approximately equal to the height (thickness) of the first scanner apparatus 20 and has a part near the base portion thereof extending to a predetermined height slightly larger than that of the tip end portion to form a pair of guide units 43. The first scanner apparatus 20 is attached to the connection unit 40 in a state inserted between the pair of extending portions 41 from a back end portion (rear face portion) thereof, by fixing the rear face portion (right end face in FIG. 1) to the supporting portion 42 using fixing tools 51 (refer to FIG. 4). In this attached state, the first scanner apparatus 20 is guided by the pair of extending portions 41 with small gaps on both sides in the width direction.

The first scanner apparatus 20 includes the main body 21 shaped as a quadrangular plate prolonged in one direction (X direction) and having an approximately constant height (thickness) and a document stand cover 22 (hereinafter, simply referred to as "cover 22") shaped as a quadrangular plate disposed to be openably closable by a hinge mechanism, not illustrated, centered in one end portion (rear portion) in the longitudinal direction of the main body 21. An operating unit 23 configured of a plurality of operating switches is disposed on a front end face in the longitudinal direction of the main body 21. A user can provide various instructions including an image reading instruction to the first scanner apparatus 20 by operating the operating unit 23.

A pair of mounting faces 44 is formed in both end portions in the longitudinal direction (width direction W) of the supporting portion 42 at an inner location from the pair of guide units 43 and is positioned at a height smaller than that of the pair of guide units 43 and larger than that of a part of the supporting portion 42 other than both end portions in the longitudinal direction as illustrated in FIG. 1. The second scanner apparatus 30 is mounted on the pair of mounting faces 44 in a state where a bottom portion thereof is supported. The second scanner apparatus 30, in a state mounted on the pair of mounting faces 44, is fixed to the connection unit 40 by fixing tools 53 (refer to FIG. 5 and FIG. 6) fixed to a rear face of the supporting portion 42. In this attached state, the second scanner apparatus 30 is guided by the pair of guide units 43 with small gaps on both sides in the width direction.

A base end portion of the cover 22 is covered by the second scanner apparatus 30 from above in an assembly state where the first scanner apparatus 20 and the second scanner apparatus 30 are attached to the connection unit 40. However, the cover 22 is openably closable to a maximum openable extent with respect to the main body 21 with no interference with the second scanner apparatus 30 because a predetermined gap is secured in the height direction Z between a top face of the cover 22 in a closed state and the second scanner apparatus 30.

A part (top face portion) of the first scanner apparatus 20 exposed in a state where the cover 22 is opened with respect to the main body 21 is a document stand 24 on which a document can be mounted as illustrated in FIG. 2. A document mounting face incorporating a transparent glass plate 24a on which a document is mounted is disposed in the document stand 24. A reading target document (not illustrated) is mounted on the glass plate 24a and is set on the glass plate 24a in a state pressed by the cover 22.

The second scanner apparatus 30, as illustrated in FIG. 1 and FIG. 2, includes a main body 31 shaped as an approximate trapezoid in a side view and having a slanted face 31A gradually lowering toward the tip end of the second scanner apparatus 30 as a front face and a cover 32 covering the slanted face 31A of the main body 31 in a closed state. A discharge port 31B through which a read document D (refer to FIG. 2) is discharged from the main body 31 and a sliding discharge tray 33 withdrawn frontward from a lower part of the discharge port 31B are disposed in a front end portion of the main body 31 as illustrated in FIG. 1.

The cover 32, as illustrated in FIG. 1 and FIG. 2, is openably closable between the closed state illustrated in FIG. 1 and the opened state illustrated in FIG. 2 by a hinge mechanism, not illustrated, centered in an upper portion of a rear face of the main body 31.

Figure 4:
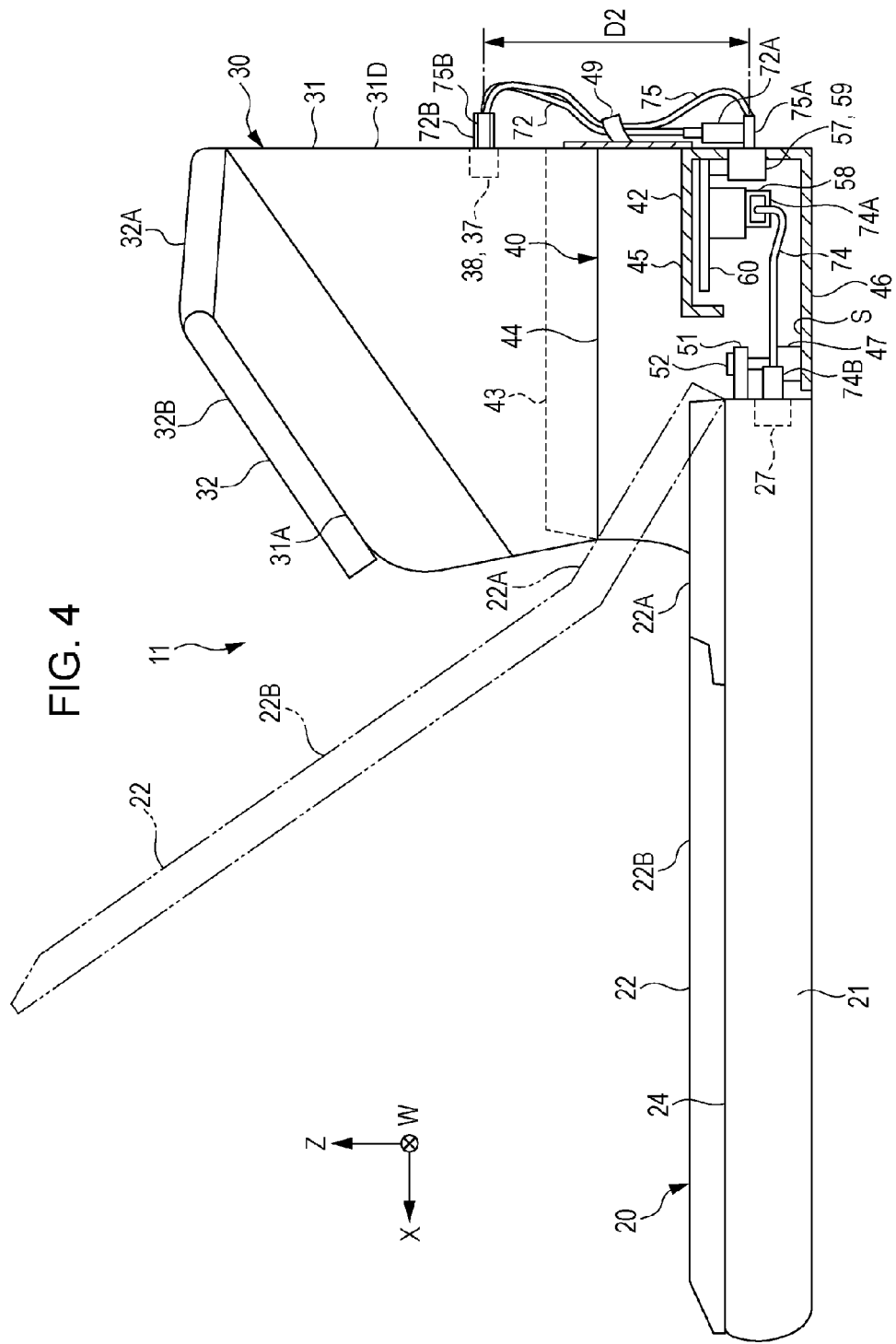
FIG. 4 is a side sectional view illustrating the image reading system.

The cover 32 is held slantwise at an attitude angle with respect to the main body 31 in the opened state illustrated in FIG. 2, and an inner face thereof in the opened state is a document mounting unit 34 on which the document D can be set in plural sheets. Specifically, the cover 32 includes a base portion 32A and a cover main body 32B that are connected to be bendable inward (toward the inner face) at a predetermined angle as illustrated in FIG. 4. Thus, the cover 32 is arranged in the closed state covering a top face of the main body 31 by bending following the shape of the top face. In the opened state, the cover 32 has the bending thereof restricted to an approximately straight angle (180°) between the base portion 32A and the cover main body 32B and thus corresponds to the document mounting unit 34 held slantwise at a predetermined angle.

A pair of guide units 36 is disposed in the document mounting unit 34 to allow plural sheets of documents D to be set in a state guided in the width direction as illustrated in FIG. 2. A feeding port 31C in which the document D is inserted is opened at a location corresponding to a tip end portion in a direction of transport of the set document D of the main body 31.

An operating unit 35 configured of a plurality of operating switches is disposed on an upper side of the slanted face 31A exposed at a time when the cover 32 is in the opened state with respect to the main body 31 as illustrated in FIG. 2. If the user provides the document reading instruction by operating the operating unit 35, the plurality of documents D set in the document mounting unit 34 is fed into the main body 31 one sheet at a time through the feeding port 31C. Then, an image of at least one side of both sides of the fed document D is read in the main body 31, and the read document D is discharged through the discharge port 31B of the main body 31 and is stacked on the withdrawn discharge tray 33.

In the image reading system 11 illustrated in FIG. 1 and FIG. 2, as an example, maximum reading resolution of the first scanner apparatus 20 is higher than maximum reading resolution of the second scanner apparatus 30. The first scanner apparatus 20 is used for reading of an image of the document D that requires relatively high resolution or for the document D configured of only one sheet to be read. Meanwhile, the second scanner apparatus 30 is used for reading of plural sheets of documents D that does not require high reading resolution. As such, the user appropriately uses the two scanner apparatuses 20 and 30 according to reading needs for reading of an image from the document D.

Figure 3:
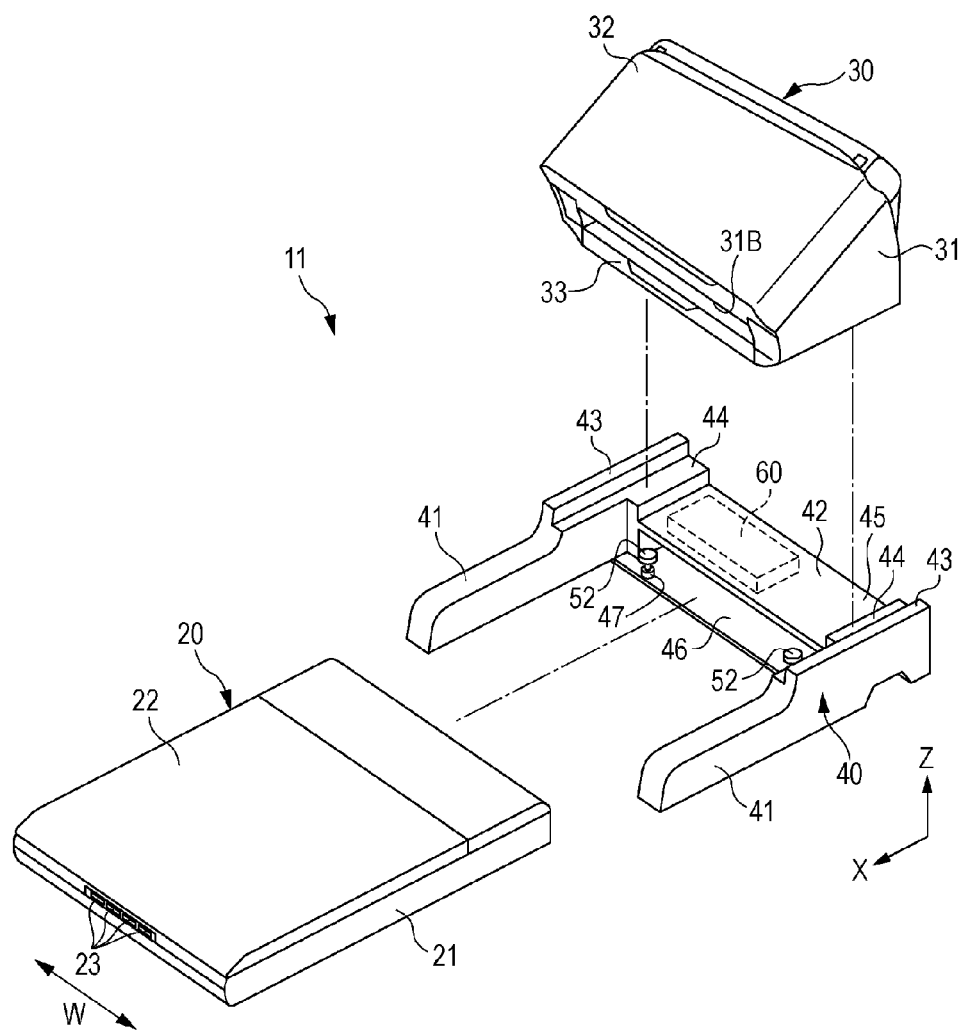
FIG. 3 is an exploded perspective view illustrating the image reading system.

Next, an assembly structure of the image reading system 11 will be described with reference to FIG. 3 to FIG. 5 and the like. As illustrated in FIG. 3, the first scanner apparatus 20 is connected to the connection unit 40 through a communication cable 74 illustrated in FIG. 4 and then is inserted between the pair of extending portions 41 of the connection unit 40 from the rear face portion (back end portion) thereof. Then, the first scanner apparatus 20 is fixed to the connection unit 40 by the fixing tools 51 at two locations in the rear face portion thereof in the width direction. Specifically, the supporting portion 42 includes a bottom plate 46 that extends further frontward than a ceiling plate 45 of the supporting portion 42, and a pair of cylindrical boss portions 47 protrudes upward from positions at a predetermined interval in the width direction on a top face of the bottom plate 46. Then, fastening members 52 such as screws or bolts are screwed into the boss portions 47 through the fixing tools 51 fixed to the rear face portion of the first scanner apparatus 20 as illustrated in FIG. 4 to fix the first scanner apparatus 20 to the connection unit 40.

The cover 22 has two divided parts of the base portion 22A and the cover main body 22B in the longitudinal direction thereof, and the base portion 22A and the cover main body 22B are connected to be bendable upward at a predetermined angle as illustrated in FIG. 4. Thus, in the assembly state illustrated in FIG. 4, the cover main body 22B can be further bent upward (toward opening of the cover 22) with respect to the base portion 22A, after the cover 22 is pivoted until the base portion 22A abuts a bottom face of the second scanner apparatus 30, and the cover 22 can be opened to the maximum openable extent.

The second scanner apparatus 30 is mounted on the pair of mounting faces 44 as illustrated in FIG. 3. In this mounted state, the main body 31 of the second scanner apparatus 30 is guided by the pair of guide units 43 on both sides in the width direction W as illustrated in FIG. 5. The second scanner apparatus 30 is fixed to the connection unit 40 by fixing the pair of fixing tools 53, fixed to positions at a predetermined interval in the width direction in a lower portion of the rear face of the main body 31, to a rear face portion of the connection unit 40 with fastening members 54 such as screws or bolts.

Figure 5:
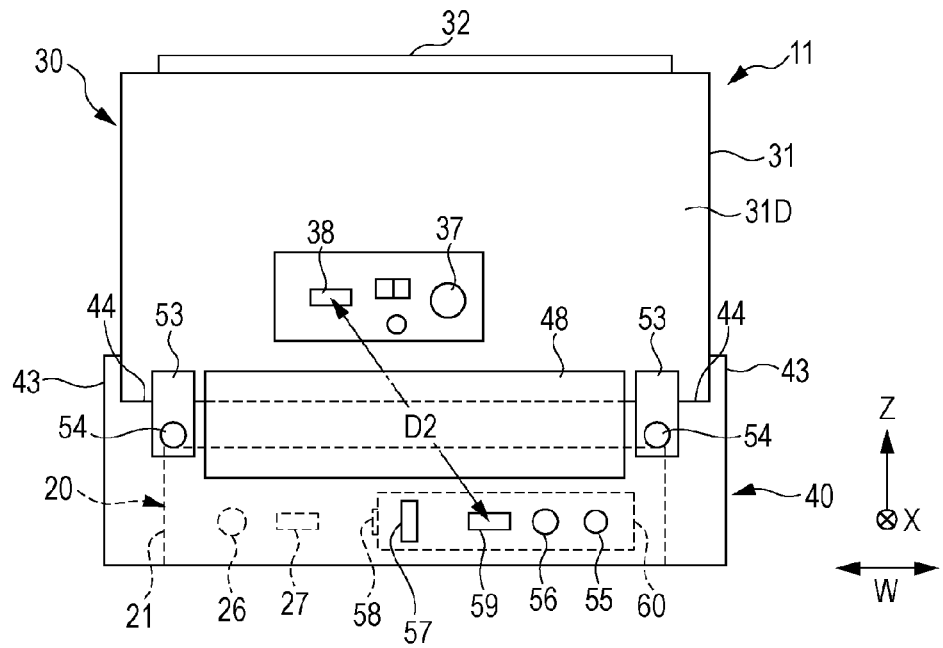
FIG. 5 is a rear view illustrating the image reading system.
Figure 6:
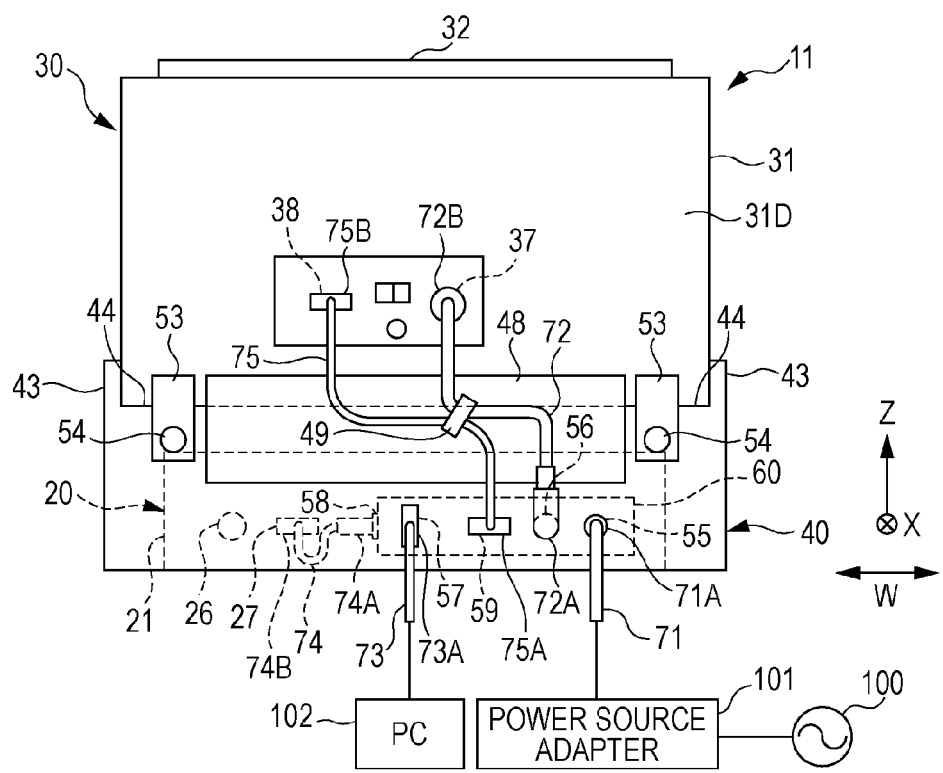
FIG. 6 is a rear view illustrating a wired state of the image reading system.

A quadrangular plate-shaped cover plate 48 is fixed to a position between the pair of fixing tools 53 in the width direction W in the rear face portion of the connection unit 40 as illustrated in FIG. 5. The cover plate 48 closes a rear face side opening of a hole passing in a front-rear direction (X direction) between the connection unit 40 and the second scanner apparatus 30. The cover plate 48 has an upper edge portion thereof extending above the mounting faces 44 and thus also functions as a guide member guiding a lower portion of the rear face of the second scanner apparatus 30. The second scanner apparatus 30 and the connection unit 40 are connected through a power source cable 72 (DC cable) and a communication cable 75 as illustrated in FIG. 4 and FIG. 6. The two cables 72 and 75 connecting the connection unit 40 and the second scanner apparatus 30 are supported in a state tied midway by a clip member 49 fixed to a predetermined location on the cover plate 48 as illustrated in FIG. 6. The cover plate 48 may not function as a guide member.

A circuit substrate 60 is arranged in the supporting portion 42 of the connection unit 40 as illustrated in FIG. 3 and FIG. 4. The circuit substrate 60 has a power division function (hub function) that divides power input from an external unit and a communication function that controls communication between a personal computer 102 (hereinafter, simply referred to as "PC 102") (refer to FIG. 6 and FIG. 7) functioning as a host apparatus (host equipment) and the two scanner apparatuses 20 and 30 functioning as device equipment. The circuit substrate 60 divides direct current power input through the power source adapter 101, supplies necessary power to the first scanner apparatus 20 through the communication cable 74, and supplies necessary power to the second scanner apparatus 30 through the power source cable 72. In the present embodiment, the docking unit 40A is configured of a part of the connection unit 40 excluding the circuit substrate 60 and each of connectors 55 to 59, that is, a part of the connection unit 40 including the extending portions 41, the supporting portion 42, the guide units 43, the mounting faces 44, the bottom plate 46, the boss portions 47, and the like.

Figure 7:
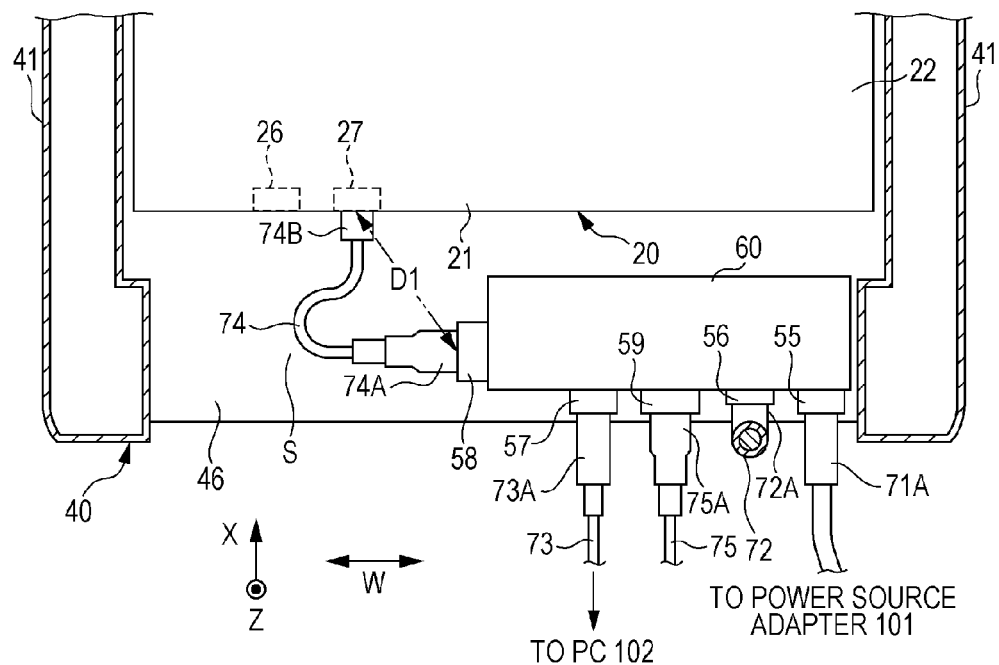
FIG. 7 is a plan sectional view illustrating a wired state of the image reading system.

Next, various connectors of a power source system and a communication system disposed in the image reading system 11 will be described with reference to FIG. 5 and FIG. 7. As illustrated in FIG. 5 and FIG. 7, a power source input connector 26 and a communication connector 27 are disposed in a rear face portion of the main body 21 of the first scanner apparatus 20. The power source input connector 26 and the communication connector 27 are arranged at positions biased toward one side of the main body 21 in the width direction W (positions near a left end in the example of FIG. 5).

A power source input connector 37 and a communication connector 38 are disposed in a rear face portion of the second scanner apparatus 30 as illustrated in FIG. 5. The power source input connector 37 and the communication connector 38 are arranged at positions slightly lower in the height direction than an approximate center position in the width direction W of the main body 31.

A power source input connector 55 and a power source output connector 56 of the power source system and three communication connectors 57 to 59 of the communication system (only two are illustrated in FIG. 5) are disposed in the rear face portion of the connection unit 40 as illustrated in FIG. 5 and FIG. 7. These connectors 55 to 59 are arranged in a substrate 61 constituting the circuit substrate 60.

Next, a wiring structure of the image reading system 11 will be described with reference to FIG. 6 and FIG. 7.

As illustrated in FIG. 6, the power source input connector 55 is connected to a power supply terminal 71A that is disposed in one end portion of an output cable 71 of the power source adapter 101. The power source adapter 101 can convert an alternating current input from a commercially available alternating current power source 100, a power source, into a direct current of a predetermined voltage ("24 volts (V)" in the present example) and output the direct current. Thus, the direct current of a predetermined voltage (24 V in the present example) from the power source adapter 101 is input as a power source to the power source input connector 55.

An output terminal 72A of the power source cable 72 is connected to the power source output connector 56 disposed in the circuit substrate 60, and an input terminal 72B at the other end of the power source cable 72 is connected to the power source input connector 37 of the second scanner apparatus 30 as illustrated in FIG. 6 and FIG. 7. Accordingly, direct current power of a predetermined voltage (24 V in the present example) is supplied from the connection unit 40 to the second scanner apparatus 30 through the power source cable 72.

A terminal 73A of a communication cable 73 having another terminal (not illustrated) connected to the PC 102 is connected to the communication connector 57 as illustrated in FIG. 6 and FIG. 7. Accordingly, the circuit substrate 60 in the connection unit 40 can communicate with the PC 102. In the present embodiment, the communication cables 73 to 75 connected to the connection unit 40 are configured of, for example, Universal Serial Bus (USB) communication cables. A USB communication cable has a communication function based on a communication line and a power supply function based on a power source line disposed inside a cladding material of the USB communication cable. In the description below, of the two communication connectors 58 and 59 mounted on the circuit substrate 60, the communication connector 58 connected to the first scanner apparatus 20 through the communication cable 74 may be referred to as "first communication connector", and the communication connector 59 connected to the second scanner apparatus 30 through the communication cable 75 may be referred to as "second communication connector".

The first communication connector 58 and the second communication connector 59 have the same connector shape to which a male terminal (type A) of a USB cable can be connected. The communication connector 27 of the first scanner apparatus 20 and the communication connector 38 of the second scanner apparatus 30 have the same connector shape to which a male terminal (type B) of a USB cable can be connected. Thus, the connector shapes of the communication connectors 27 and 38 and of the communication connectors 58 and 59 may bring the possibility that erroneous connections are made by connecting the first communication cable 74 and the second communication cable 75 incorrectly to the first communication connector 58 and the second communication connector 59 that have the same connector shape as the communication connectors 27 and 38 but have a different level of power supplied therefrom.

A terminal 74A (type A) of the communication cable 74 is connected to the first communication connector 58 disposed in the circuit substrate 60, and a terminal 74B (type B) at the other end of the communication cable 74 is connected to the communication connector 27 (type B) of the first scanner apparatus 20 as illustrated in FIG. 6 and FIG. 7. Accordingly, the PC 102 can communicate with the first scanner apparatus 20. The first scanner apparatus 20 can perform a scan operation by receiving a scan instruction from the PC 102 in addition to a scan instruction based on operating of the operating unit 23 and can transfer image data of the document D read by the scan operation to the PC 102 through the communication cables 73 and 74. Supply of power from the connection unit 40 to the first scanner apparatus 20 is performed through the first communication cable 74 configured of a USB communication cable including a power source line. In the present example, DC 5 V×500 mA power is supplied from the connection unit 40 to the first scanner apparatus 20 through the communication cable 74.

A terminal 75A (type A) of the communication cable 75 is connected to the second communication connector 59 disposed in the circuit substrate 60, and a terminal 75B (type B) at the other end of the communication cable 75 is connected to the communication connector 38 (refer to FIG. 6) of the second scanner apparatus 30 as illustrated in FIG. 6 and FIG. 7. Accordingly, the PC 102 can communicate with the second scanner apparatus 30. The second scanner apparatus 30 can perform a scan operation by receiving a scan instruction from the PC 102 in addition to a scan instruction based on operating of the operating unit 35 and can transfer image data of the document D read by the scan operation to the PC 102 through the communication cables 73 and 75.

The present embodiment uses the communication cables 74 and 75 of the same type (USB communication type). Thus, there is a concern that erroneous connections are made by connecting the communication cables 74 and 75 to incorrect connectors. Therefore, a structure for preventing erroneous connections of the communication cables 74 and 75 is employed. Hereinafter, the structure that prevents erroneous connections of the communication cables 74 and 75 will be described.

The first communication connector 58 disposed in the circuit substrate 60 of the present embodiment can supply, for example, DC 5 V×500 mA power, and the second communication connector 59 can supply, for example, DC 5 V×5 mA power. Thus, if the communication cables 74 and 75 are connected to incorrect connectors, power cannot be supplied to the first scanner apparatus 20. Therefore, a structural consideration that prevents connections of the communication cables 74 and 75 to incorrect connectors is made in the present embodiment. In the description below, the communication cable 74 connected to the first scanner apparatus 20 may be referred to as "first communication cable 74", and the communication cable 75 connected to the second scanner apparatus 30 may be referred to as "second communication cable 75".

The first communication cable 74 and the second communication cable 75 have different lengths. Specifically, a length L1 of the first communication cable 74 is smaller than a length L2 of the second communication cable 75 (L1<L2). In the assembly state illustrated in FIG. 7, a first distance D1 between the communication connector 27 of the first scanner apparatus 20 and the first communication connector 58 of the circuit substrate 60 is smaller than a second distance D2 between the communication connector 38 of the second scanner apparatus 30 and the second communication connector 59 of the circuit substrate 60 illustrated in FIG. 4 and FIG. 5 (D1<D2).

A third distance D3 is the shorter one of two distances of the distance between the communication connectors 27 and 59 which is one incorrect combination and the distance between the communication connectors 38 and 58 which is another incorrect combination, that is, the former distance between the communication connectors 27 and 59. That is, in the present example, the third distance D3 is the distance between the communication connector 27 to which the terminal 74B of the shorter first communication cable 74 is to be connected and the incorrect second communication connector 59 of the circuit substrate 60 to which the terminal 74A of the first communication cable 74 is not to be connected. The first distance D1 is smaller than the third distance D3 (D1<D3).

In the present embodiment, the circuit substrate 60 is arranged at a predetermined position in the connection unit 40 where the above conditions of the distances D1, D2, and D3 may be satisfied with respect to the position of the communication connector 27 of the first scanner apparatus 20 and the position of the communication connector 38 of the second scanner apparatus 30 in the assembly state.

The circuit substrate 60 is arranged at a position biased toward one end of the connection unit 40 in the width direction W as illustrated in FIG. 7. The communication connector 27 of the first scanner apparatus 20 is positioned to be biased toward one end of the main body 21 (left end in FIG. 7) in the width direction W. Thus, the circuit substrate 60 is arranged at a position biased toward the opposite side in the width direction W of the connection unit 40 (right side in FIG. 7) from the side (left end) in the width direction W of the main body 21 toward which the communication connector 27 is positioned to be biased in the width direction W. Accordingly, the circuit substrate 60 does not exist at a position rearward of (in the reverse X direction from) the communication connector 27. By biasing the circuit substrate 60 in the width direction W with respect to the connection unit 40, a space S is formed on the opposite side of the connection unit 40 from the side toward which the circuit substrate 60 is biased and is positioned between the communication connector 27 of the first scanner apparatus 20 and the first communication connector 58. Thus, the space S that can be used as an installation space and an accommodative space for the first communication cable 74 connecting the connection unit 40 and the first scanner apparatus 20 is secured in an area rearward of the communication connector 27.

Therefore, the shorter first communication cable 74 connected between the communication connectors 27 and 58 is accommodated in the space S as illustrated in FIG. 7. Since the length of the first communication cable 74 is not excessively large as illustrated in FIG. 4 and FIG. 7, the first communication cable 74 does not obstruct opening and closing of the cover 22 of the first scanner apparatus 20. For example, there is no concern of pinching of the first communication cable 74 by the cover 22. The presence of the space S facilitates a wiring work of connecting the first communication cable 74 between the communication connectors 27 and 58.

The first communication connector 58 is disposed in an end portion (left end in FIG. 7) of the circuit substrate 60 on the opposite side of the connection unit 40 from the side toward which the circuit substrate 60 is biased in the width direction W as illustrated in FIG. 7. That is, the first communication connector 58 is arranged at a position biased with respect to the circuit substrate 60 in the same direction as the direction in which the communication connector 27 is biased with respect to the main body 21. Thus, the first distance D1 between the communication connectors 27 and 58 is relatively small. The direction in which the circuit substrate 60 is biased corresponds to a direction in which the second communication connector 59 is separated from the communication connector 27 in the width direction W. Thus, the first communication connector 58 that is to be a connection target of the communication connector 27 can be arranged closer to the communication connector 27 than the second communication connector 59 which is inappropriate as the connection target, and the second communication connector 59 can be separated from the communication connector 27.

Next, setting of the lengths of the first communication cable 74 and the second communication cable 75 will be described with reference to FIG. 5, FIG. 7, and the like. As illustrated in FIG. 7, the length L1 of the first communication cable 74 is larger than the first distance D1 and is smaller than the second distance D2 (D1<L1<D2).

Furthermore, the length L1 of the first communication cable 74 is larger than the first distance D1 and is smaller than the third distance D3 in the present example (D1<L1<D3). The length L2 of the second communication cable 75 is larger than the second distance D2 (L2>D2).

Figure 9:
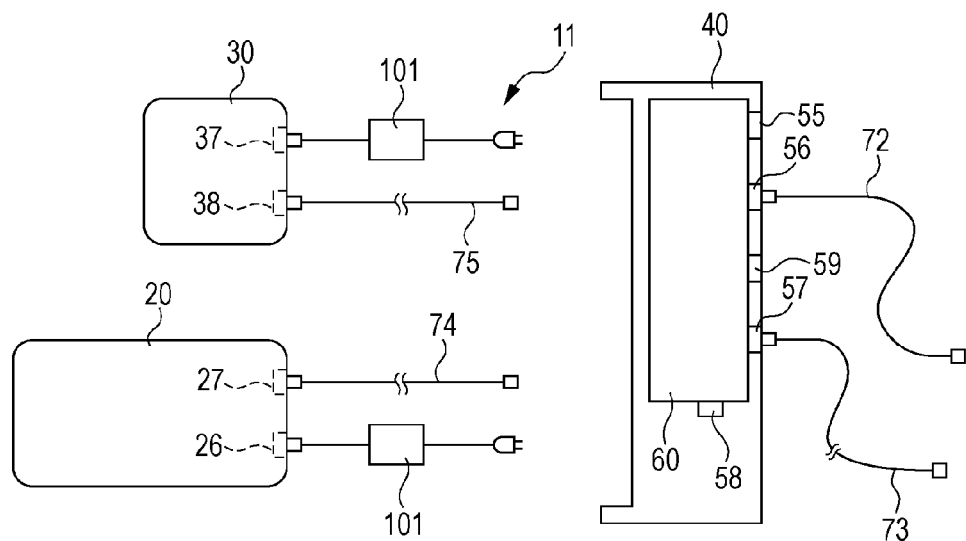
FIG. 9 is a schematic plan view illustrating a pre-assembly state of the image reading system.

The first scanner apparatus 20 and the second scanner apparatus 30 illustrated in FIG. 9 are also sold individually. The first scanner apparatus 20, if purchased, comes with the power source adapter 101 and the communication cable 74 as accessories. The second scanner apparatus 30, if purchased, comes with the power source adapter 101 and the communication cable 75 as accessories. The connection unit 40, if purchased, comes with the power source cable 72 (DC cable) and the communication cable 73 as accessories.

Figure 10:
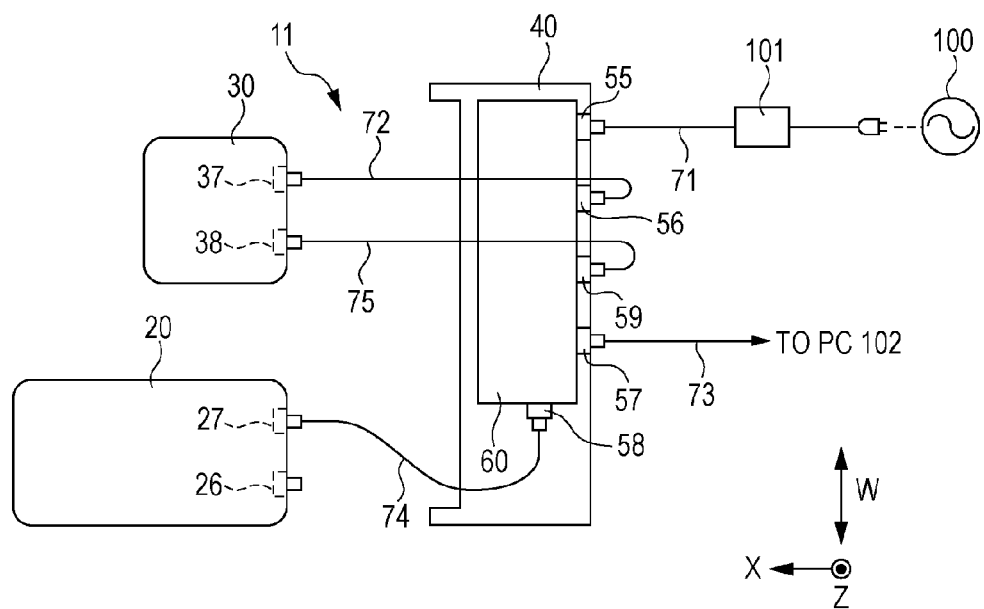
FIG. 10 is a schematic plan view illustrating a wired state of the image reading system.

In a case of assembling the image reading system 11, one power source adapter 101 which is an accessory of either the first scanner apparatus 20 or the second scanner apparatus 30 is connected to the power source input connector 55 of the connection unit 40 as illustrated in FIG. 10. The connection unit 40 and the PC 102 are connected through the communication cable 73. The first scanner apparatus 20 and the connection unit 40 are connected through the communication cable 74. The second scanner apparatus 30 and the connection unit 40 are connected through the power source cable 72 and the communication cable 75.

Therefore, the power source adapter 101 is not required to be included as an accessory in the connection unit 40 since the power source adapter 101 which is an accessory of either the first scanner apparatus 20 or the second scanner apparatus 30 can be used. If the second scanner apparatus 30 does not come with the power source adapter 101 assuming that power is supplied through the communication cable 74, the power source adapter 101 that the first scanner apparatus 20 comes with is used, and the power source adapter 101 is connected to the power source input connector 55 of the connection unit 40.

Next, an electrical configuration of the image reading system 11 will be described with reference to FIG. 11.

Figure 11:
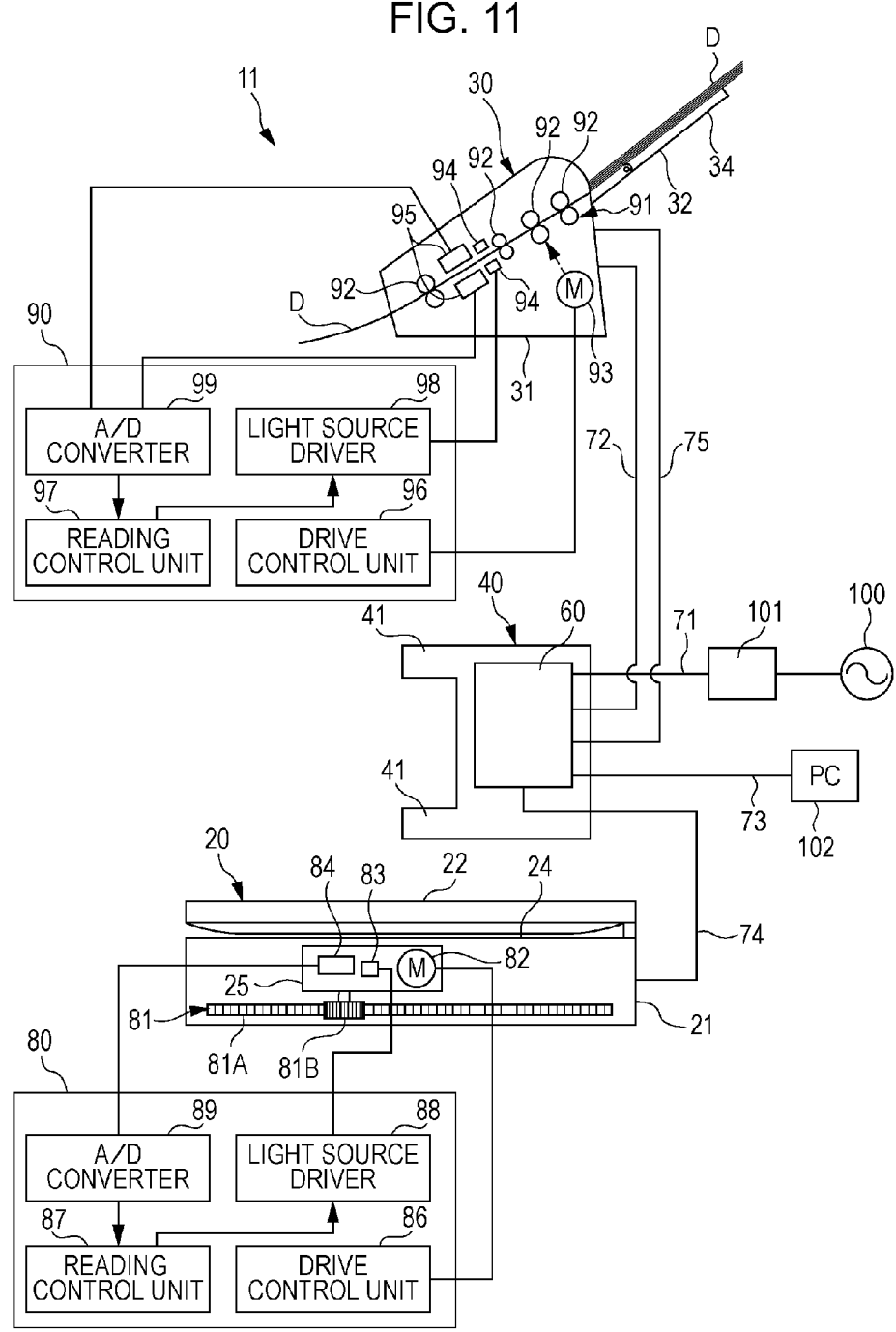
FIG. 11 is a block diagram illustrating an electrical configuration of the image reading system.

As illustrated in FIG. 11, the connection unit 40 is connected to the output cable 71 of the power source adapter 101 connected to the commercially available alternating current power source 100. Thus, an alternating current of a predetermined voltage (for example, 100 V or 200 V) supplied from the commercially available alternating current power source 100 is converted (stepped down) into direct current power of a predetermined voltage in the range of, for example, 10 V to 50 V (24 V in the present example), and the direct current power is input from the power source adapter 101 to the circuit substrate 60 of the connection unit 40. The input power is divided by the circuit substrate 60 to supply 5 V×500 mA direct current power to the first scanner apparatus 20 through the first communication cable 74 and 24 V direct current power to the second scanner apparatus 30 through the power source cable 72.

The first scanner apparatus 20, as illustrated in FIG. 11, includes a controller 80 that controls scanning. The second scanner apparatus 30 includes a controller 90 that controls scanning. The circuit substrate 60 connected to the PC 102 through the communication cable 73 is connected to the controller 80 of the first scanner apparatus 20 through the first communication cable 74 and is connected to the controller 90 of the second scanner apparatus 30 through the second communication cable 75. The controller 80, while being schematically drawn outside of the first scanner apparatus 20 in FIG. 11, is arranged within the main body 21. The controller 90, while being schematically drawn outside of the second scanner apparatus 30 in FIG. 11, is arranged within the main body 31.

The first scanner apparatus 20, as illustrated in FIG. 11, includes a carriage 25 that can be moved in the sub-scanning direction (X direction) by a motive power transmission mechanism 81 disposed in the main body 21. The carriage 25 incorporates a scanning motor 82 which is an example of a motive power source. The motive power transmission mechanism 81 is, for example, a rack-and-pinion mechanism in which rotation of a pinion 81B by motive power of the scanning motor 82 in the carriage 25 moves the pinion 81B in a direction depending on the direction of rotation in the longitudinal direction of a rack 81A engaging the pinion 81B, and thus, the carriage 25 can be moved in the sub-scanning direction. The carriage 25 includes a light source 83 and a reader 84. The reader 84 includes an image sensor extending in the main-scanning direction (width direction W). The scanning motor 82, the light source 83, and the reader 84 are controlled by the controller 80. The motive power transmission mechanism 81 of the carriage 25 is not limited to a gear mechanism and may be a belt mechanism, and the scanning motor 82 may not be arranged in the carriage 25 and may be arranged in the main body 21.

The controller 80 includes a drive control unit 86, a reading control unit 87, a light source driver 88, and an A/D converter 89. The controller 80, if receiving a scan instruction by operating of the operating unit 23 (refer to FIG. 1) or by communication from the PC 102, instructs the drive control unit 86 and the reading control unit 87 to perform a scan operation.

The drive control unit 86, if receiving an instruction, drives the scanning motor 82 to move the carriage 25 in the sub-scanning direction at a constant speed. The reading control unit 87, if receiving an instruction, controls emission of the light source 83 using the light source driver 88 to irradiate a reading region of the document D with light. The reading control unit 87 controls the reader 84 configured of, for example, a line sensor to read an image of the document D. An analog image signal read by the reader 84 is converted into a digital signal by the A/D converter 89 configured of, for example, an analog front-end integrated circuit (IC) and is input into the reading control unit 87. The reading control unit 87 performs a known correction process such as shading correction and gamma correction on the input digital image signal and generates image data of the document D. The image data is transmitted from the controller 80 to the circuit substrate 60 through the communication cable 74 and is further transferred from the circuit substrate 60 to the PC 102 through the communication cable 73.

The second scanner apparatus 30, as illustrated in FIG. 11, includes a transport mechanism 91 that transports the document D into the main body 31. The transport mechanism 91 performs a transport operation that includes feeding plural sheets of the documents D set in the document mounting unit 34 into the main body 31 one sheet at a time, transporting the fed document D along a transport path at a constant transport speed, and discharging through the discharge port 31B the document D of which an image is read during the transporting. The transport mechanism 91 includes a plurality of roller pairs 92 that is arranged along the transport path in the main body 31. The plurality of roller pairs 92 is rotated by motive power of a transport motor 93 which is a motive power source. Of the plurality of roller pairs 92, the feeding roller pair 92 that is arranged at a most upstream position in the direction of transport includes retard rollers, and rotation of the roller pair 92 feeds plural sheets of the documents D set in the document mounting unit 34 one sheet at a time in order from, for example, the lowermost document D.

A pair of light sources 94 and a pair of readers 95 arranged on both sides of the transport path are disposed midway of the transport path in the main body 31 as illustrated in FIG. 11. The readers 95 are configured of image sensors extending in the main-scanning direction (width direction W). When "single side" is specified as a read side of the document D, one reader 95 corresponding to the single read side performs a read operation. Meanwhile, when "double sides" is specified, the pair of readers 95 performs a read operation together. The transport motor 93, the light sources 94, and the readers 95 are controlled by the controller 90.

The controller 90 includes a drive control unit 96, a reading control unit 97, a light source driver 98, and an A/D converter 99. The controller 90, if receiving a scan instruction by operating of the operating unit 35 (refer to FIG. 2) or by communication from the PC 102, instructs the drive control unit 96 and the reading control unit 97 to perform a scan operation.

The drive control unit 96, if receiving an instruction, drives the transport motor 93 to rotate the plurality of roller pairs 92, thereby feeding plural sheets of the documents D set in the document mounting unit 34 into the main body 31 one sheet at a time and transporting the fed document D along the transport path at a constant transport speed. The reading control unit 97 controls emission of the light sources 94 using the light source driver 98 to irradiate the reading region of the document D with light. During the transporting, the reading control unit 97 controls the readers 95 configured of, for example, image sensors to read an image of the document D. An analog image signal read by the readers 95 is converted into a digital signal by the A/D converter 99 configured of, for example, an analog front-end IC and is input into the reading control unit 97. The reading control unit 97 performs a known correction process such as shading correction and gamma correction on the input digital image signal and generates image data of the document D.

The image data is transmitted from the controller 90 to the circuit substrate 60 through the communication cable 75 and is further transferred from the circuit substrate 60 to the PC 102 through the communication cable 73. As such, the circuit substrate 60 has the power division function that divides and supplies input power to each of the scanner apparatuses 20 and 30 and the communication function that selects a communication target from the PC 102 and each of the scanner apparatuses 20 and 30 and selects a communication path to enable communication with the selected communication target.

Next, a detailed configuration of the circuit substrate 60 will be described with reference to FIG. 10. The circuit substrate 60 is a circuit substrate that controls the power source system and the communication system. The circuit substrate 60 is arranged in a direction in which a mounting face thereof is parallel to a direction intersecting the height direction Z of the first scanner apparatus 20 attached to the connection unit 40. The circuit substrate 60 includes a substrate 61 and a power source system component group and a communication system component group mounted on the substrate 61. The connectors 55 and 56 of the power source system and the communication connectors 57 to 59 of the communication system are mounted in a peripheral portion of the substrate 61. A communication controller integrated circuit (IC) 63 (hub IC) as an example of a communication controller circuit, a first step down circuit 64, a second step down circuit 65, an overcurrent protector circuit 66, and a resistor element 67 are mounted on the substrate 61.

The power source input connector 55 is connected to the power supply terminal 71A of the output cable 71 of the power source adapter 101 and is supplied with, for example, 24 V direct current power. An output terminal of the power source input connector 55 is connected to an input terminal of the power source output connector 56 through a power source line 111.

Thus, the power source output connector 56 can supply 24 V direct current power to another connected unit. Accordingly, the circuit substrate 60 can supply 24 V power source power to the second scanner apparatus 30 through the power source cable 72 connected to the power source output connector 56. The power source input connector 55 is made by using a comparatively large and hard component because the frequency at which the user inserts and pulls the power supply terminal 71A of the power source adapter 101 is comparatively high. Meanwhile, the power source output connector 56 is made by using a component smaller than the power source input connector 55 because the power source cable 72 is rarely inserted or pulled once connected between the power source output connector 56 and the power source input connector 37 of the second scanner apparatus 30.

Figure 12:
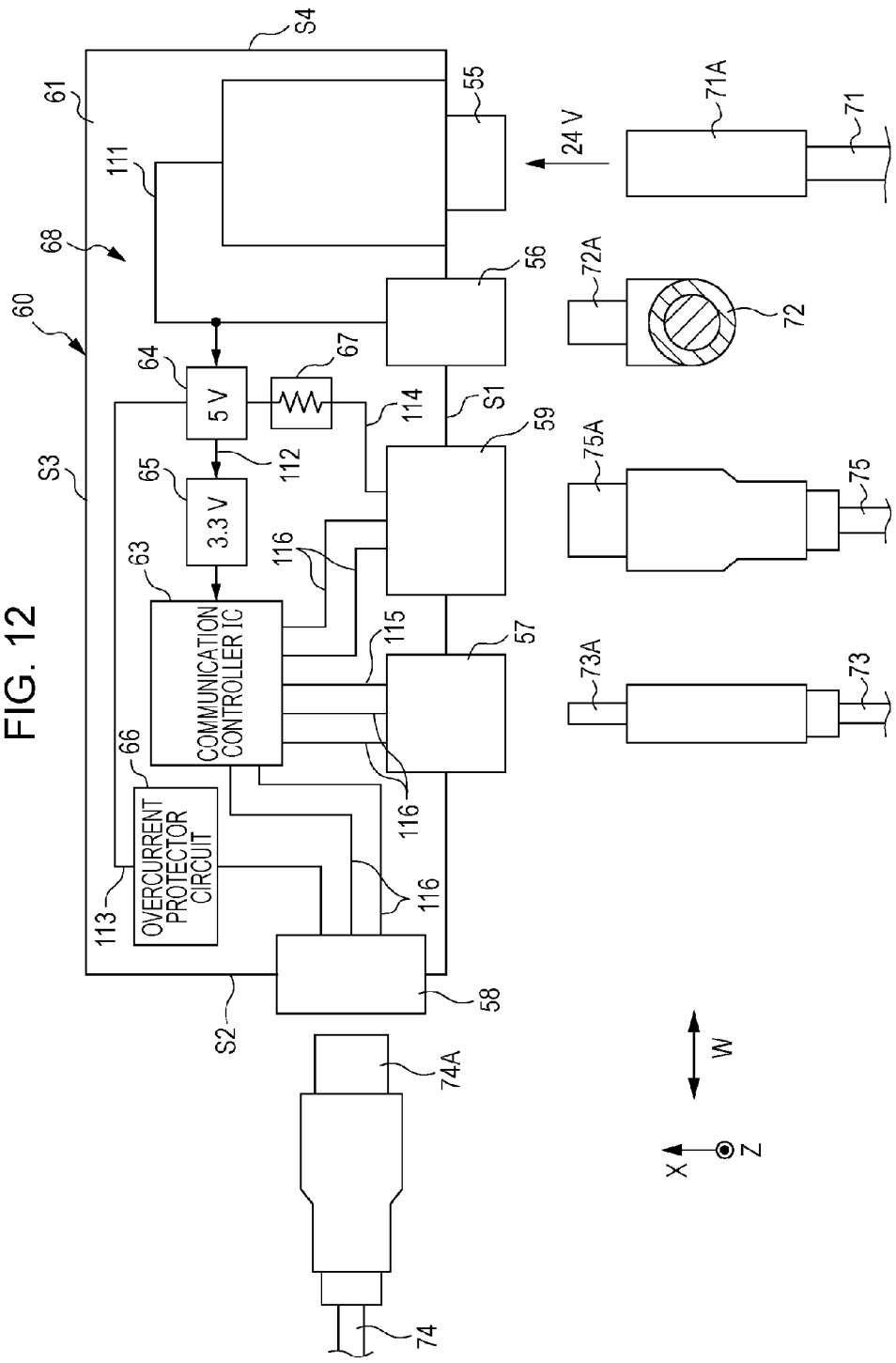
FIG. 12 is a schematic plan view illustrating a circuit configuration of a circuit substrate and connectors.

A power source line 112 that branches off midway of the power source line 111 connected to the output terminal of the power source input connector 55 is connected to the communication controller IC 63 as illustrated in FIG. 12. The first step down circuit 64 and the second step down circuit 65 are disposed in series in this order midway of the power source line 112. The first step down circuit 64 steps down the input power source voltage (for example, 24 V) to a predetermined voltage (for example, 5 V) and outputs the stepped down voltage. The second step down circuit 65 steps down the input voltage (for example, 5 V) from the first step down circuit 64 to a predetermined voltage (for example, 3.3 V) and outputs the stepped down voltage. The power of a predetermined voltage (3.3 V) output from the second step down circuit 65 is input to the communication controller IC 63.

A power source line 113 connected to another output terminal of the first step down circuit 64 is connected to the first communication connector 58, and the overcurrent protector circuit 66 is disposed midway of the power source line 113. The communication connector 58 can supply 5 V×500 mA power source power. The circuit substrate 60 supplies 5 V×500 mA power source power to the first scanner apparatus 20 through the first communication cable 74 of which the terminal 74A is connected to the communication connector 58. The overcurrent protector circuit 66 prevents output of an overcurrent to a unit to which the communication connector 58 is connected even if, for example, a short circuit (short) occurs from any cause in the first scanner apparatus 20 to which power is supplied. The controller 80 of the first scanner apparatus 20 detects connection of the first communication cable 74 between the communication connectors 27 and 58 by a voltage (for example, 5 V).

A power source line 114 connected to still another output terminal of the first step down circuit 64 is connected to the second communication connector 59, and the resistor element 67 is disposed midway of the power source line 114. A current output from the communication connector 59 is decreased to a small predetermined value (for example, a predetermined value in the range of 1 mA to 50 mA) by passing through the resistor element 67. This is because the second communication connector 59 is used in only communication and not in supply of power, and supply of power source power to the second scanner apparatus 30 uses the power source output connector 56. The controller 90 of the second scanner apparatus 30 detects connection of the communication cable 75 between the communication connectors 38 and 59 by a voltage (for example, 5 V). A current value that the second communication connector 59 can output is decreased by the resistor element 67 to a small value to the extent allowing generation of the connection detecting voltage (for example, 5 V) and protection from an overcurrent. As such, the first communication connector 58 can supply power (for example, 0.5 W) of a predetermined value (for example, 5 V×100 mA) or more to a unit connected thereto, while the second communication connector 59 can supply power less than a predetermined value (for example, 5 V×100 mA) to a unit connected thereto. That is, the power (for example, 0.5 W) that the first communication connector 58 can supply to a connection target thereof is different from the power (for example, a value less than or equal to 0.25 W) that the second communication connector 59 can supply to a connection target thereof.

In the present embodiment, a power divider 68 is configured of the power source lines 111 to 113, the first step down circuit 64, and the overcurrent protector circuit 66. The power divider 68 divides 24 V power, input by the power source input connector 55 from the power source adapter 101, into 24 V power and 5 V×500 mA power, outputs the divided 24 V power from the power source output connector 56, and outputs the 5 V×500 mA power from the first communication connector 58. In the present embodiment, the power source output connector 56 and the first communication connector 58 constitute an example of "plurality of power outputters". The power source output connector 56 constitutes examples of "first power outputter" and "first connector", and the first communication connector 58 constitutes examples of "second power outputter" and "second connector".

The communication connector 57 is connected to the communication controller IC 63 through a power source line 115. Power that is supplied from the PC 102 to the communication connector 57 through the communication cable 73 can be supplied to the communication controller IC 63 through the power source line 115.

The communication controller IC 63 is connected to each of the communication connectors 57 to 59 through a pair of communication lines 116. The communication controller IC 63 can communicate with the PC 102 through the communication cable 73 connected to the communication connector 57. The communication controller IC 63 can transmit an instruction from the PC 102 to the specified first scanner apparatus 20 through the communication cable 74 connected to the first communication connector 58 or to the specified second scanner apparatus 30 through the communication cable 75 connected to the second communication connector 59. The communication controller IC 63 has a function that transfers image data received from either the first scanner apparatus 20 or the second scanner apparatus 30 to the PC 102.

A group of the connectors 55 and 56 of the power source system and a group of the communication connectors 57 to 59 of the communication system are arranged as separate groups in the substrate 61 as illustrated in FIG. 12. The substrate 61 constituting the circuit substrate 60 has a predetermined plate shape surrounded by a plurality of sides in a plan view thereof viewed in the thickness direction thereof. The substrate 61 of the present example is formed into a rectangle including four sides S1 to S4 as the predetermined shape. The circuit substrate 60 is installed in the connection unit 40 in a direction in which the longitudinal direction of the substrate 61 is parallel to the width direction W and the thickness direction thereof is parallel to the height direction Z. The substrate 61 has the first side S1 as a long side positioned on a rear face side (lower side in FIG. 12) in the front-rear direction (X direction) of the connection unit 40 opposite to the first scanner apparatus 20 and extending parallel to the width direction W and has the second side S2 as a short side intersecting (in the present example, particularly, being orthogonal with respect to) the first side S1.

The four connectors 55 to 57 and 59 are arranged along the first side S1, a long side, in the substrate 61 in a direction in which the direction of connection thereto is equal to the X direction. On the second side S2, of the two sides S2 and S4 (short sides) intersecting the first side S1 in the substrate 61, that is positioned on the opposite side of the connection unit 40 from the side (right side in FIG. 12) toward which the circuit substrate 60 is biased with respect to the connection unit 40, the first communication connector 58 is arranged in a direction in which the direction of connection thereto intersects (in the present example, particularly, is orthogonal with respect to) the direction of connection to the second communication connector 59.

In the circuit substrate 60 of the present example, particularly, the first step down circuit 64 and the second step down circuit 65 are arranged further in a direction (second direction) opposite to the direction (first direction) in which the circuit substrate 60 is biased with respect to the connection unit 40 than the connector 55 of the power source system in the width direction W, and the communication controller IC 63 is arranged further in the second direction than both of the step down circuits 64 and 65. The second communication connector 59 is arranged further in the X direction (that is, the sub-scanning direction of the first scanner apparatus 20) than both of the step down circuits 64 and 65 at a position on the opposite side (where the first side S1 exists) of the substrate 61 from the position at which the first scanner apparatus 20 is arranged. The first communication connector 58 is positioned further in the second direction than the communication controller IC 63 and, particularly, is arranged on the second side S2 in the present example. As such, the number of connectors (four in the present example) arranged on the first side S1, a long side, of the substrate 61 is larger than the number of connectors (one in the present example) arranged on the second side S2, a short side.

The second communication connector 59 is arranged on the first side S1 positioned on the opposite side of the substrate 61 from the first scanner apparatus 20 in the front-rear direction (X direction) and in a direction in which the direction of connection thereto is equal to the X direction. The first communication connector 58 is arranged on the second side S2 intersecting (in the present example, particularly, being orthogonal with respect to) the first side S1 in the substrate 61 and in a direction in which the direction of connection thereto intersects (particularly, is orthogonal with respect to) the direction of connection to the second communication connector 59.

The power source input connector 55 and the power source output connector 56 of the power source system are adjacently arranged in an end portion on the first side S1 of the substrate 61 near the fourth side S4 as illustrated in FIG. 12. The power source input connector 55 is arranged in an end portion in the longitudinal direction (width direction W) of the substrate 61 on the opposite side (fourth side S4 side) of the power source output connector 56 from a region where the group of the communication connectors 57 to 59 are arranged in the width direction W. This is because, if the power source input connector 55 having a comparatively large size is arranged at a position other than the end portion of the substrate 61, a region on the opposite side of the power source input connector 55 from the group of the communication connectors 57 to 59 in the width direction W (longitudinal direction of the substrate) is likely to be an empty space that may not be used for component mounting or wiring formation, and the efficiency of an area that can be used for component mounting and wiring formation in the substrate 61 is decreased.

Meanwhile, the communication connectors 57 and 59 are adjacently arranged at positions on the first side S1 of the substrate 61 closer to the second side S2 than the group of connectors 55 and 56 of the power source system, and the communication connector 58 is arranged on the second side S2 as illustrated in FIG. 12. Accordingly, the three communication connectors 57 to 59 are adjacently arranged as a group along a periphery of the substrate 61. The two communication connectors 58 and 59 connected to the first step down circuit 64 through the power source lines 113 and 114 are arranged on both sides of the communication connector 57 connected to the communication controller IC 63 through the power source line 115.

Each of plural pairs (three pairs in the example of FIG. 12) of the communication lines 116 connecting the three communication connectors 57 to 59 and the communication controller IC 63 is arranged in parallel as illustrated in FIG. 12. Two pairs of the communication lines 116 connected to the two communication connectors 58 and 59 positioned at both ends of the communication connector group are arranged along paths near the communication lines 116 connected to the communication connector 57 positioned at the center of the group. The two power source lines 113 and 114 connecting the two communication connectors 58 and 59 and the output terminal of the first step down circuit 64 are arranged along paths that surround the communication controller IC 63 and plural pairs (three pairs) of the communication lines 116 on approximately three sides excluding the peripheral part of the substrate 61.

The power source line 113 connected to the first communication connector 58 is connected to the output terminal of the first step down circuit 64 through the opposite side (front side) of the communication controller IC 63 from a region where the communication lines 116 are formed. The power source line 114 connected to the communication connector 59 is arranged along a path passing through the side of the three pairs of the communication lines 116 on which the connectors 55 and 56 of the power source system exist and is connected to the output terminal of the first step down circuit 64. As such, the three pairs of the communication lines 116 extend on wiring paths interposed between the power source lines 113 and 114 from the communication controller IC 63 arranged inside of wiring paths of the power source lines 113 and 114 and are connected to each of the communication connectors 57 to 59. Thus, the three pairs of the communication lines 116 are arranged to have no intersection with the power source lines 113 to 115 on the substrate 61.

The first communication connector 58 is disposed on the second side S2 intersecting the first side S1. Thus, there is no connector arranged on the third side S3 that faces the first side S1 of the substrate 61 in the X direction. Therefore, the first scanner apparatus 20 can be arranged in a position deeply inserted into the connection unit 40 in a depth direction (direction opposite to the X direction), that is, in a position moved closer to the circuit substrate 60. Accordingly, as described above, the total length in the X direction of the image reading system 11 is decreased, and the image reading system 11 is compactly realized.

Next, a structure of the substrate 61 on which the communication lines 116 are arranged will be described with reference to FIG. 8.

Figure 8:
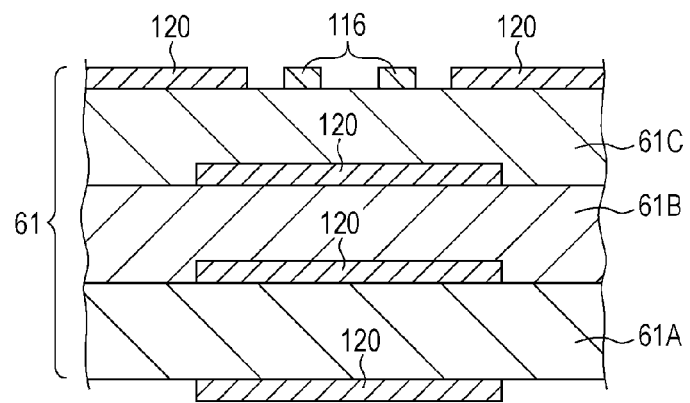
FIG. 8 is a sectional view illustrating a part of a substrate in which communication lines are installed.

As illustrated in FIG. 8, the substrate 61 is a multilayer substrate and is configured of a plurality (three in the example of FIG. 8) of substrate layers 61A to 61C. Plural pairs (only one pair is illustrated in FIG. 8) of the communication lines 116 are surrounded by ground layers 120 formed in the same substrate layer 61C and ground layers 120 formed in the other substrate layers 61A and 61B. Specifically, one pair of the communication lines 116 is interposed between the ground layers 120 formed on the surface of the same substrate layer 61C on both sides and is surrounded by a plurality of ground layers 120 arranged on the surfaces or inner surfaces of the substrate layers 61A and 61B below in a manner to overlap in a laminate direction with a region where the one pair of the communication lines 116 is formed. As such, in the present example, plural pairs of the communication lines 116 are surrounded by a plurality of ground layers 120 on three sides as illustrated in FIG. 8. As such, plural pairs of the communication lines 116 do not intersect the power source lines 111 to 115. Thus, noise from the power source lines 111 to 115 is not likely to be superimposed on a signal or data transmitted through the communication lines 116.

Next, the effect of the image reading system 11 will be described. When the image reading system 11 is used, a plug of the power source adapter 101 of which the power supply terminal 71A is connected to the power source input connector 55 of the connection unit 40 is inserted into a plug outlet of the commercially available alternating current power source 100. Each of the cables 71 to 75 is connected to the image reading system 11 as illustrated in FIG. 6 and FIG. 11.

The first scanner apparatus 20 and the second scanner apparatus 30 are turned on by operating a power switch in each of the operating units 23 and 35. Then, direct current power of a predetermined voltage (for example, 24 V) converted by the power source adapter 101 from power of a power source voltage (for example, 100 V) supplied from the commercially available alternating current power source 100 is input to the power source input connector 55.

The power of a predetermined voltage (for example, 24 V) input from the power source input connector 55 is divided into two types of power by the power divider 68 in the circuit substrate 60 of the connection unit 40. That is, divided power of a predetermined voltage (24 V) is output from the power source output connector 56 through the power source line 111. The power of a predetermined voltage (24 V) divided and supplied to the power source line 112 branching off from the power source line 111 is stepped down to a predetermined voltage (for example, 5 V) by the first step down circuit 64, and the predetermined voltage stepped down is output from the first communication connector 58 through the power source line 113.

Then, 24 V direct current power is supplied to the flatbed scanner apparatus 20 from the circuit substrate 60 through the power source cable 72 connected between the connectors 56 and 37 of the power source system. In addition, 5 V×500 mA power is supplied to the sheet-fed scanner apparatus 30 from the circuit substrate 60 through the communication cable 74 connected between the connectors 27 and 58.

As such, according to the image reading system 11, power that is input to the power source input connector 55 of the connection unit 40 is divided by the power divider 68 in the circuit substrate 60. Each divided power is supplied to the first scanner apparatus 20 from the communication connector 58 through the communication cable 74 and is supplied to the second scanner apparatus 30 from the power source output connector 56 through the power source cable 72. Thus, the number of power source adapters 101 required to be connected to the image reading system 11 is one. That is, the necessary number of power source adapters can be decreased relative to the number of scanner apparatuses 20 and 30 constituting the image reading system 11.

The controller 80 in the first scanner apparatus 20, after the first scanner apparatus 20 is turned on, recognizes that the communication connector 27 is connected to the first communication connector 58 of the connection unit 40 through the first communication cable 74 if a 5 V voltage is input from the communication connector 27. Similarly, the controller 90 in the second scanner apparatus 30, after the second scanner apparatus 30 is turned on, recognizes that the communication connector 38 is connected to the second communication connector 59 of the connection unit 40 through the second communication cable 75 if a 5 V voltage is input from the communication connector 38. On this connection condition, each of the scanner apparatuses 20 and 30 can communicate with the PC 102.

The user uses the flatbed scanner apparatus 20 when reading a comparatively thick document (reading target) such as a passport. The user uses the sheet-fed scanner apparatus 30 when reading plural sheets of documents, sets plural sheets of the documents D in the document mounting unit 34, and causes the scanner apparatus 30 to read an image of the document D. At this time, the scanner apparatus 20 transports plural sheets of the documents D set in the document mounting unit 34 into the main body 31 one sheet at a time and reads an image of the document D midway of the transport path using the reader 95.

Flowing of an overcurrent into the first scanner apparatus 20 through the first communication cable 74 is avoided by the overcurrent protector circuit 66 in the circuit substrate 60 even if, for example, a short circuit (short) occurs in the first scanner apparatus 20. A current output from the second communication connector 59 is restricted to a predetermined value (for example, a value in the range of 1 mA to 50 mA) by the resistor element 67 in the circuit substrate 60 even if, for example, a short circuit (short) occurs in the second scanner apparatus 30. Thus, flowing of an overcurrent into the second scanner apparatus 30 through the second communication cable 75 is avoided. Since the resistor element 67 disposed midway of the power source line 114 connected to the second communication connector 59 restricts a current value to a small extent, the simple use of the resistor element 67 can avoid flowing of an overcurrent into the second scanner apparatus 30 at the time of a short circuit without using the overcurrent protector circuit 66.

According to the present embodiment described in detail thus far, the following effects can be obtained.

(1) Power that is input from the power source input connector 55 (an example of a power receiver) disposed in the connection unit 40 is divided by the power divider 68 including the power source lines 111 to 113 and the first step down circuit 64, in the assembly state where the first scanner apparatus 20 and the second scanner apparatus 30 are integrally assembled by using the connection unit 40. Each divided power is output to each of the scanner apparatuses 20 and 30 from the power source output connector 56 and the first communication connector 58 (examples of a power outputter) disposed in the connection unit 40. Thus, the necessary number of power source adapters 101 used in supply of power from the power source to the image reading system 11 can be decreased compared with a configuration in which the power source adapter 101 is individually connected to the plurality of scanner apparatuses 20 and 30.

(2) The power source input connector 55 (an example of a power receiver) receives direct current power that is converted by the power source adapter 101 from an alternating current input from the commercially available alternating current power source 100. The received direct current power can be divided by the power divider 68 including the power source lines 111 to 113 and the first step down circuit 64, and each divided power can be supplied to each of the scanner apparatuses 20 and 30 from the power source output connector 56 and the first communication connector 58 (examples of a power outputter). Thus, the number of power source adapters 101 required in the image reading system 11 can be decreased relative to the number of scanner apparatuses 20 and 30.

(3) Two connectors (the first connector of the first power outputter and the second connector of the second power outputter) that supply each power divided in the circuit substrate 60 to the first and second scanner apparatuses 20 and 30 include communication connectors having a power supply function or power source output connectors. Each power divided by the power divider 68 of the circuit substrate 60 is supplied to the first scanner apparatus 20 through the communication cable 74 connected to the first communication connector 58 and is supplied to the second scanner apparatus 30 through the power source cable 72 connected to the power source output connector 56. Thus, power source system components such as the power source adapter 101 are not required to be connected to the first and second scanner apparatuses 20 and 30. Therefore, power can be supplied to the first and second scanner apparatuses 20 and 30 if the communication cable 74 or the power source cable 72 is prepared, and the number of power source adapters 101 required in the image reading system 11 can be decreased relative to the number of scanner apparatuses 20 and 30.

(4) The first communication connector 58 having a power supply function (an example of the first connector) and the power source output connector 56 (an example of the second connector) correspond to the two connectors supplying each power divided by the power divider 68 of the circuit substrate 60 to the first and second scanner apparatuses 20 and 30. Power is supplied to the first scanner apparatus 20 through the communication cable 74 connected to the first communication connector 58, and power is supplied to the second scanner apparatus 30 through the power source cable 72 connected to the power source output connector 56. The presence of the first scanner apparatus 20 to which power is supplied through a communication cable allows a decrease in the necessary number of power source adapters 101 relative to the number of scanner apparatuses 20 and 30 and, in addition, allows a decrease in the necessary number of cables compared with a configuration in which a power source cable and a communication cable are individually connected to the scanner apparatuses 20 and 30.

(5) The connection unit 40 includes the communication connector 57 communicably connectable to the PC 102 which is a host apparatus, the first communication connector 58, the power source output connector 56, and the second communication connector 59. Power divided by the power divider 68 of the circuit substrate 60 is supplied to the first scanner apparatus 20 through the communication cable 74 connected to the first communication connector 58. The other divided power is supplied to the second scanner apparatus 30 through the power source cable 72 connected to the power source output connector 56. The PC 102 that is connected to the communication connector 57 of the connection unit 40 through the communication cable 73 can communicate with the first scanner apparatus 20 through the communication cable 74 connected to the first communication connector 58 included in the connection unit 40 and can communicate with the second scanner apparatus 30 through the communication cable 75 connected to the second communication connector 59. Since the communication paths are divided in the circuit substrate 60, a communication cable is not required to be directly connected individually between the PC 102 and the scanner apparatuses 20 and 30. Thus, the number of cables can be relatively small.

(6) The first communication connector 58 supplies power of a predetermined value (for example, 5 V×100 mA) or more to a unit connected thereto, and the second communication connector 59 supplies power less than a predetermined value to a unit connected thereto. Thus, even if the first communication connector 58 and the second communication connector 59 are incorrectly connected at a time of connecting the communication cables 74 and 75 between the connection unit 40 and the scanner apparatuses 20 and 30, the erroneous connection can be found comparatively easily since power is not supplied. In addition, the overcurrent protector circuit that prevents an overcurrent at a time of occurrence of a short circuit (short) from any cause in the second scanner apparatus 30 connected to the second communication connector 59 through the communication cable 75 is not required to be disposed on the second communication connector 59 side of the connection unit 40, and the resistor element 67 is used instead.

(7) The first communication cable 74 connecting the communication connector 27 of the first scanner apparatus 20 and the first communication connector 58 is the same type of cable as the second communication cable 75 connecting the communication connector 38 of the second scanner apparatus 30 and the second communication connector 59 but have a different length. In the assembly state, the first distance D1 between the communication connector 27 and the first communication connector 58 is different from the second distance D2 between the communication connector 38 and the second communication connector 59. Particularly, the first communication cable 74 is shorter than the second communication cable 75, and the first distance D1 is smaller than the second distance D2. The length L1 of the first communication cable 74 is larger than the first distance D1 and is smaller than the second distance D2. The length L2 of the second communication cable 75 is larger than the second distance D2. Thus, the frequency of occurrence of erroneous connection made by connecting the communication cables 74 and 75 to incorrect connectors can be reduced at a time of connecting the communication cables 74 and 75 to the communication connectors 27, 58, 38, and 59.

(8) Given that the third distance D3 is the shorter one of two distances of the distance between the communication connector 27 of the first scanner apparatus 20 and the second communication connector 59 and the distance between the communication connector 38 of the second scanner apparatus 30 and the first communication connector 58, the length L1 of the first communication cable 74 is smaller than the third distance D3 (L1<D3). Thus, erroneous connection made by connecting the first communication cable 74 between the incorrect communication connectors 27 and 59 can be prevented.

(9) In the assembly state, by biasing the circuit substrate 60 in the width direction W with respect to the connection unit 40, the space S is positioned between the communication connector 27 of the first scanner apparatus 20 and the first communication connector 58 on the opposite side of the connection unit 40 from the side toward which the circuit substrate 60 is biased. Thus, the first communication cable 74 connected between the communication connectors 27 and 58 can be accommodated in the space S. Therefore, the first communication cable 74 does not act as an obstruction, and the problem, for example, of pinching of the first communication cable 74 at a time of opening and closing of the cover 22 of the first scanner apparatus 20 can be avoided.

(10) The group of the power source input connector 55 and the power source output connector 56 of the power source system and the group of the communication connectors 57 to 59 of the communication system are arranged at positions separated for each group in the substrate 61. The power source lines 111 and 113 to 115 and plural pairs of the communication lines 116 connected to the communication connectors 57 to 59 are arranged along non-intersecting paths on the substrate 61. Thus, noise from the power source lines 113 to 115 is not likely to be superimposed on a signal or data transmitted through the communication lines 116, and communication can be performed with high reliability.

(11) On the substrate 61, mounted are the first step down circuit 64 that steps down the power source voltage input from the power source input connector 55 to a predetermined voltage and outputs the stepped down voltage to the communication connectors 58 and 59, and the communication controller IC 63 that controls communication performed through the communication connectors 57 to 59. Thus, a necessary voltage (for example, 5 V) can be supplied to the first and second scanner apparatuses 20 and 30 through each of the communication connectors 58 and 59 and can be used for detecting connection of the communication cables 74 and 75, and communication can be performed between the PC 102 and the first and second scanner apparatuses 20 and 30 through each of the communication connectors 57 to 59.

(12) In the substrate 61, the two power source lines 113 and 114 that extend from the output terminal of the first step down circuit 64 to the two communication connectors 58 and 59 positioned at both ends of the group of the communication connectors 57 to 59 are arranged along paths surrounding the communication controller IC 63 and the three pairs of the communication lines 116 connecting the communication controller IC 63 and the communication connectors 57 to 59. Thus, the three pairs of the communication lines 116 can be arranged on the substrate 61 without intersecting the power source lines 113 and 114. As a consequence, superimposition of noise from the power source lines 113 and 114 and the like on a signal or data transmitted through the communication lines 116 is easily avoided.

(13) The communication lines 116 are arranged in the substrate 61 along paths surrounded by the ground layers 120 formed in the substrate 61. Thus, noise is not likely to be superimposed on a signal transmitted through the communication lines 116, and communication can be performed with high reliability.

(14) The substrate 61 has a predetermined shape (rectangle in the present example) surrounded by the plurality of sides S1 to S4 in a plan view thereof viewed in the thickness direction thereof. The second communication connector 59 is arranged on the first side S1 that is positioned on the opposite side of the substrate 61 from the first scanner apparatus 20 in the front-rear direction (X direction). The first communication connector 58 is arranged on the second side S2 intersecting (in the present example, particularly, being orthogonal with respect to) the first side S1 of the substrate 61 and in a direction in which the direction of connection thereto intersects (particularly, is orthogonal with respect to) the direction of connection to the second communication connector 59. Thus, the first distance D1 can be relatively small by closely arranging the communication connectors 27 and 58, the first scanner apparatus 20 can be arranged in a state deeply inserted in the X direction into the connection unit 40 to a defined position moved closer to the substrate 61, and the size of the image reading system 11 can be reduced in the X direction by an amount corresponding to the moving of the position.

(15) The number of connectors arranged on the first side S1, a long side, of the substrate 61 is smaller than the number of connectors arranged on the second side S2, a short side. Thus, the total length of the image reading system 11 can be decreased in the direction of the short side of the substrate 61 (X direction), and the size of the image reading system 11 can be reduced in the X direction.

(16) The circuit substrate 60 is configured to divide and supply power, input by the power source input connector 55 from the power source adapter 101, to the first scanner apparatus 20 and to the second scanner apparatus 30. Thus, the power source adapter 101 is not required to be connected to each of the scanner apparatuses 20 and 30. Therefore, the number of power source adapters 101 required in the image reading system 11 can be decreased.

(17) The power source output connector 56 connected to the second scanner apparatus 30 through the power source cable 72 and the second communication connector 59 connected to the second scanner apparatus 30 through the communication cable 75 are adjacently arranged in the connection unit 40. Thus, the power source cable 72 and the communication cable 75 are easily tied into one. For example, the two lines of the power source cable 72 and the communication cable 75 can be tied and fixed to the connection unit 40 by the clip member 49.

(18) The connection unit 40 includes the docking unit 40A to which the plurality of scanner apparatuses 20 and 30 is attached, the power source input connector 55 (an example of a power receiver) to which power is input, the power divider 68 dividing power input from the power source input connector 55 into plural types of power, and the first communication connector 58 and the power source output connector 56 outputting each divided power. Thus, in the assembly state, the power input from the power source input connector 55 is divided by the power divider 68, and each divided power is output to each of the scanner apparatuses 20 and 30 from the first communication connector 58 and the power source output connector 56. Therefore, the power source adapter 101 is not required to be individually connected to each of the scanner apparatuses 20 and 30, and the number of power source adapters 101 required in the image reading system 11 can be decreased.

The above embodiment can be modified in the following forms.

Figure 13:
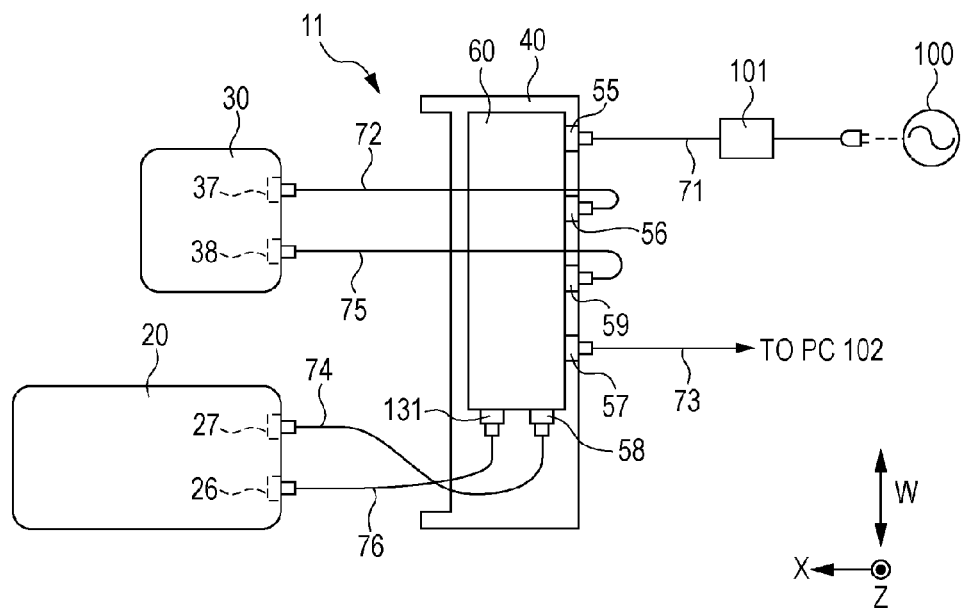
FIG. 13 is a schematic plan view illustrating a wired state of an image reading system in a modification example.
Figure 14:
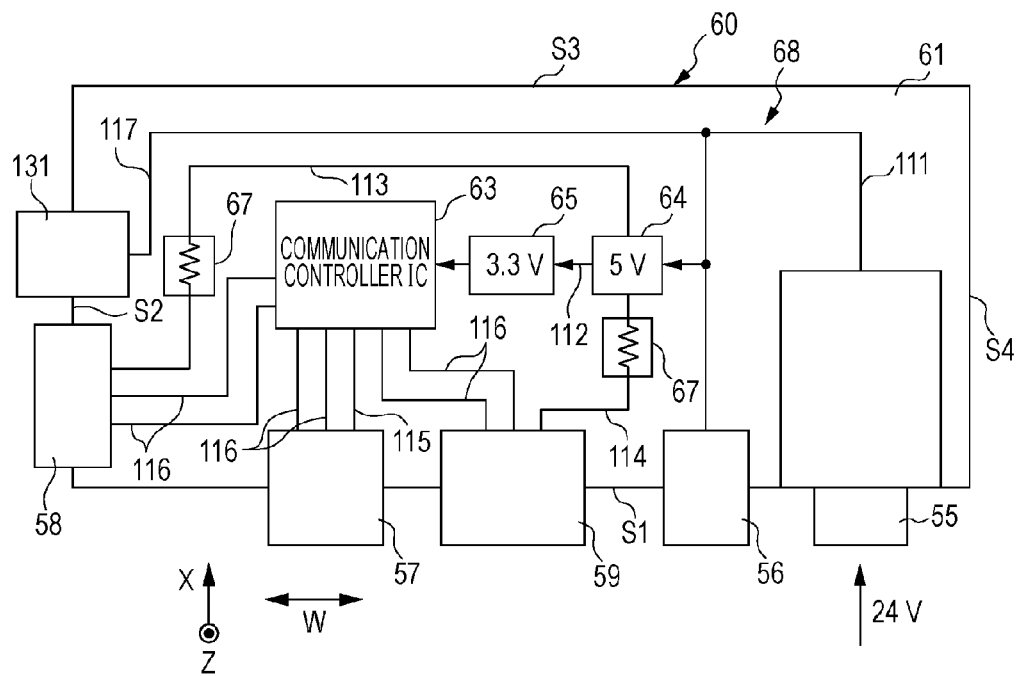
FIG. 14 is a schematic plan view illustrating a circuit configuration of a circuit substrate.

Power may be supplied to both of the two scanner apparatuses 20 and 30 through power source cables 72 and 76 as illustrated in FIG. 13. The connection unit 40 includes two power source output connectors 56 and 131. The power source output connector 131 and the power source input connector 26 of the first scanner apparatus 20 are connected through the power source cable 76, and the power source output connector 56 and the power source input connector 37 of the second scanner apparatus 30 are connected through the power source cable 72. The first communication connector 58 and the communication connector 27 of the first scanner apparatus 20 are connected through the communication cable 74, and the second communication connector 59 and the communication connector 38 of the second scanner apparatus 30 are connected through the communication cable 75. In addition, as illustrated in FIG. 14, in the circuit substrate 60 of the connection unit 40, the power source line 111 connected to the output terminal of the power source input connector 55 is connected to the power source output connector 56 which is an example of the second connector and a second power source connector, and a power source line 117 that branches off from the power source line 111 is connected to the power source output connector 131 which is an example of the first connector and a first power source connector. Thus, the power source output connectors 56 and 131 together can supply a predetermined voltage (for example, 24 V). Two output terminals of the first step down circuit 64 are respectively connected to the communication connectors 58 and 59 through the power source lines 113 and 114, and the resistor element 67 is disposed midway of the power source lines 113 and 114. Thus, the communication connectors 58 and 59 can output a predetermined voltage (for example, less than or equal to 5 V) and supply power less than a predetermined value (for example, 5 V×100 mA). Therefore, the power source output connectors 56 and 131 are responsible for supply of power source power, and the communication connectors 58 and 59 are used in communication and can supply only a predetermined voltage necessary for detecting connection of the scanner apparatuses 20 and 30 through connection of the communication cables 74 and 75.

Figure 15:
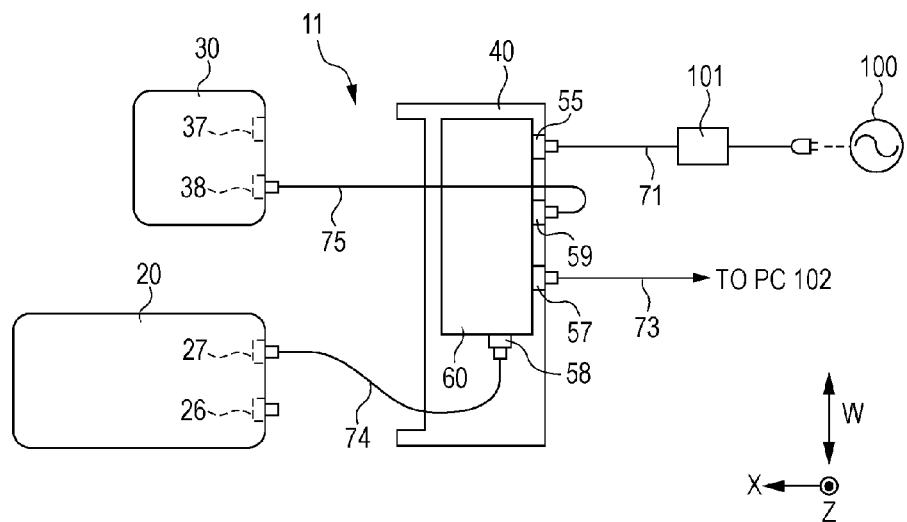
FIG. 15 is a schematic plan view illustrating a wired state of an image reading system in a modification example different from FIG. 13.
Figure 16:
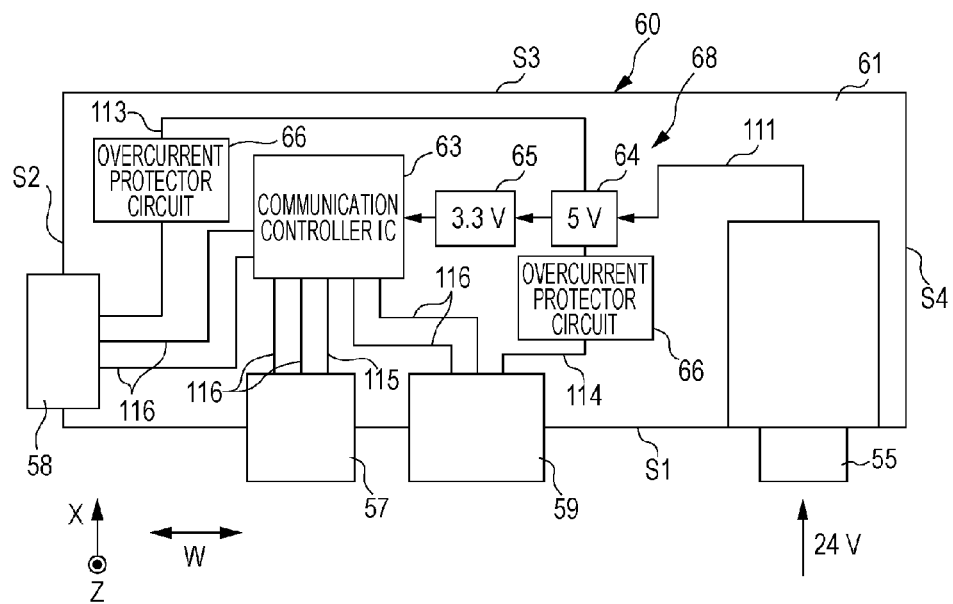
FIG. 16 is a schematic plan view illustrating a circuit configuration of a circuit substrate.

The connection unit 40 may supply power to both of the two scanner apparatuses 20 and 30 through the communication cables 74 and 75 as illustrated in FIG. 15. The connection unit 40 includes the power source input connector 55 and the communication connectors 57 to 59 but does not include a power source output connector. Supply of power from the connection unit 40 to the first scanner apparatus 20 is performed through the communication cable 74 that is connected between the communication connector 58 and the communication connector 27 of the first scanner apparatus 20. Supply of power from the connection unit 40 to the second scanner apparatus 30 is performed through the communication cable 75 that is connected between the communication connector 59 and the communication connector 38 of the second scanner apparatus 30. In addition, as illustrated in FIG. 16, the output terminal of the power source input connector 55 is connected to the input terminal of the first step down circuit 64 through the power source line 111 in the circuit substrate 60 of the connection unit 40. Two output terminals of the first step down circuit 64 are respectively connected to the communication connectors 58 and 59 through the power source lines 113 and 114, and the overcurrent protector circuit 66 is disposed midway of the power source lines 113 and 114. Thus, the two communication connectors 58 and 59 have a power supply function. In the circuit substrate 60, the power divider 68 is configured of the power source lines 111, 113, and 114, the first step down circuit 64, and the overcurrent protector circuits 66. The power supplied by the communication connector 58 may be different from the power supplied by the communication connector 59. The communication connectors 58 and 59 of the circuit substrate 60 constitute an example of "plurality of power outputters". The first communication connector 58 constitutes examples of "first power outputter" and "first connector", and the second communication connector 59 constitutes examples of "second power outputter" and "second connector".

Figure 17:
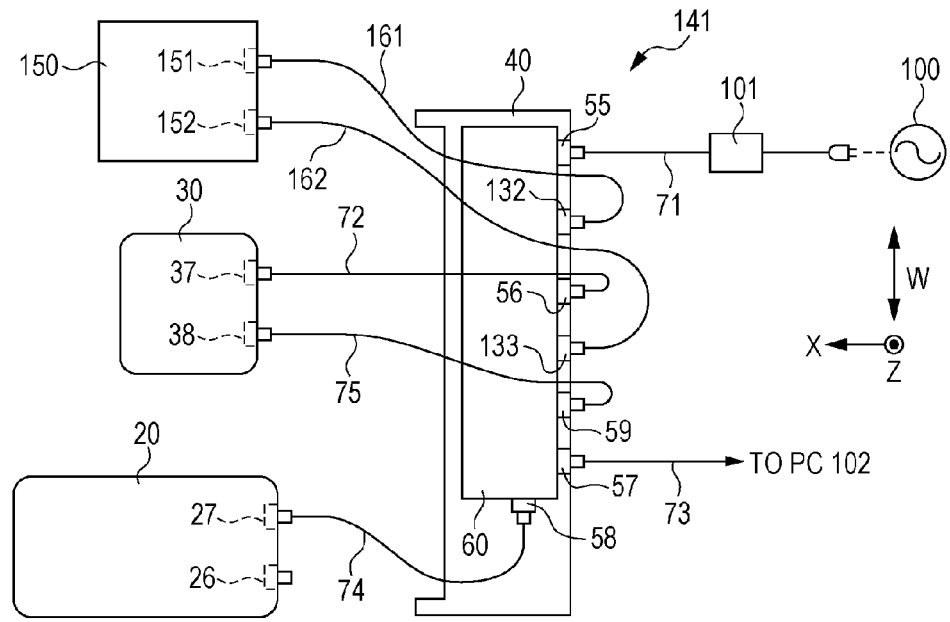
FIG. 17 is a schematic plan view illustrating a wired state of an image reading system in a modification example different from FIG. 15.

A plurality of image formation apparatuses assembled by the connection unit 40 is not limited to image reading apparatuses. The image formation apparatus may be a printing apparatus (printer or multifunction printer) that forms an image on a medium such as a paper by printing. For example, an image formation system 141 illustrated in FIG. 17 is configured by integrally assembling the two scanner apparatuses 20 and 30 and a printer 150 using the connection unit 40. The printer 150 includes a power source input connector 151 and a communication connector 152. The connection unit 40 includes two power source output connectors 56 and 132. The power source output connector 132 and the power source input connector 151 of the printer 150 are connected through a power source cable 161, and the power source output connector 56 and the power source input connector 37 of the second scanner apparatus 30 are connected through the power source cable 72. The first communication connector 58 and the communication connector 27 of the first scanner apparatus 20 are connected through the communication cable 74, and the second communication connector 59 and the communication connector 38 of the second scanner apparatus 30 are connected through the communication cable 75. In the circuit substrate 60 of the connection unit 40, the power source output connector 132 is disposed instead of the power source output connector 131 in the circuit configuration illustrated in FIG. 14, and one extra communication connector 133 is disposed. Two output terminals of the first step down circuit 64 are respectively connected to the communication connectors 59 and 133 through wiring, and the resistor element 67 is disposed midway of the wiring. Thus, the communication connectors 59 and 133 do not have a power supply function. A power divider is configured of power source lines that branch off midway of connections between the power source input connector 55 and the two power source output connectors 56 and 132.

In the configuration of FIG. 17, power may be supplied to the first scanner apparatus 20 through the power source cable 76 (refer to FIG. 13) by adding the power source output connector 131 (in FIG. 13 and FIG. 14) to the circuit substrate 60. In FIG. 17, an image formation apparatus to which power is supplied through a power source cable can be appropriately selected from N (where N is a natural number greater than or equal to three) image formation apparatuses and may be, for example, two of the first scanner apparatus 20 and the printer 150 or two of the second scanner apparatus 30 and the printer 150.

Figure 18:
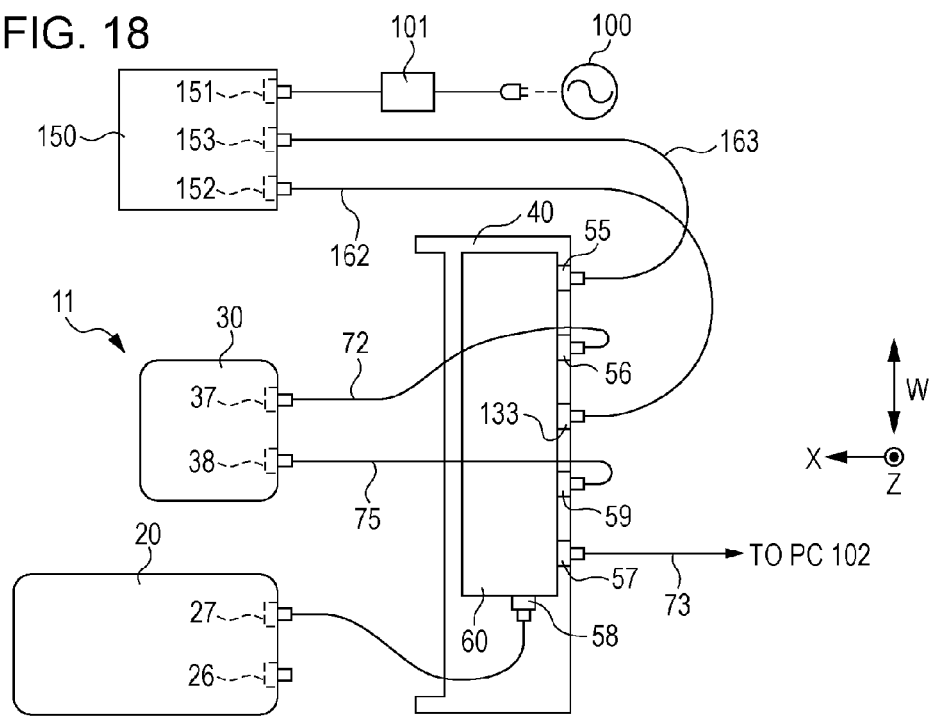
FIG. 18 is a schematic plan view illustrating a wired state of an image reading system in a modification example different from FIG. 17.

The present embodiment is not limited to a configuration in which the power source adapter 101 is connected to the power source input connector 55 of the connection unit 40. For example, as illustrated in FIG. 18, the two scanner apparatuses 20 and 30 are integrally assembled by the connection unit 40. The printer 150 includes the power source input connector 151, the communication connector 152, and a power source output connector 153. The power source adapter 101 is connected to the power source input connector 151 of the printer 150. The power source output connector 153 of the printer 150 and the power source input connector 55 of the connection unit 40 are connected by a power source cable 163. The printer 150 outputs power of a predetermined voltage input from the power source input connector 151 to the power source input connector 55 of the connection unit 40 from the power source output connector 153 through the power source cable 163. The connection unit 40 includes one power source output connector 56. The power source output connector 56 and the power source input connector 37 of the second scanner apparatus 30 are connected through the power source cable 72. The communication connector 152 of the printer 150 and the communication connector 133 are connected through a communication cable 162. The communication connector 58 and the communication connector 27 of the first scanner apparatus 20 are connected through the communication cable 74, and the communication connector 59 and the communication connector 38 of the second scanner apparatus 30 are connected through the communication cable 75. Even in this configuration, the connection unit 40 can divide power input from the printer 150 into plural types of power using a power divider, not illustrated, of the circuit substrate 60 and can divide power and supply each divided power to the plurality of scanner apparatuses 20 and 30. According to this configuration, the image reading system 11 does not require a power source adapter. An image formation apparatus that outputs power supplied from the power source adapter 101 to the connection unit 40 is not limited to the printer 150 and may be either the first scanner apparatus 20 or the second scanner apparatus 30.

In the above embodiment, power may be supplied to the first scanner apparatus 20 through a power source cable and to the second scanner apparatus 30 through a communication cable from the connection unit 40. In this case, a circuit substrate may be configured by removing the power source output connector 56 and replacing the resistor element 67 connected to the second communication connector 59 with the overcurrent protector circuit 66 in the circuit substrate 60 illustrated in FIG. 14.

The first communication connector 58 in the above embodiment and the power source output connector 131 in FIG. 14 may be arranged on the third side S3 facing the first side S1 of the substrate 61 near the first scanner apparatus 20.

The direction in which the communication connector 27 of the first scanner apparatus 20 is biased in the width direction W with respect to the main body 21 may be opposite to that of the above embodiment (to the right side in FIG. 7). In this case, the circuit substrate 60 may be arranged at a position biased to the left side of FIG. 7 with respect to the connection unit 40. Then, the first communication connector 58 may be arranged on the fourth side S4 (an example of a second side) of the circuit substrate 60 on the right side of FIG. 7.

In the above embodiment, the circuit substrate 60 may not be biased in the width direction W with respect to the connection unit 40.

In the above embodiment, the two power source lines 113 and 114 connecting output terminals of the first step down circuit 64 and the two communication connectors 58 and 59 may be arranged along paths surrounding the communication controller IC 63 and plural pairs (three pairs) of the communication lines 116 on approximately two sides instead of being arranged along paths surrounding the communication controller IC 63 and plural pairs of the communication lines 116 on approximately three sides. As such, the power source lines 113 and 114 may be paths that surround the communication controller IC 63 and the communication lines 116 on at least two sides.

In the above embodiment, the communication connector 27 of the first scanner apparatus 20 may not be biased in the width direction W with respect to the main body 21.

In the above embodiment, the positions where the power source input connector 55 and the power source output connector 56 are arranged in the circuit substrate 60 may be reversed.

While the connectors 55 and 56 of the power source system and the communication connectors 57 to 59 are arranged in a substrate in the above embodiment and in each modification example, at least one connector may be installed in the connection unit 40 at a position separated from the substrate 61 in a state electrically connected to the substrate 61 through wiring such as a cable. For example, the three connectors 55 to 57 exposed on the rear face of the connection unit 40 may be installed in the connection unit 40 in a state separated from the substrate 61. For example, all of the connectors 55 to 59 of the connection unit 40 may be installed in the connection unit 40 in a state separated from the substrate 61.

In the above embodiment and in each modification example, the direction in which the circuit substrate 60 is arranged in the connection unit 40 may be appropriately changed. For example, the circuit substrate 60 may be arranged in a direction (vertically) in which the mounting face (surface) thereof is parallel to the height direction Z.

In the above embodiment, the first communication connector 58 may be arranged on the first side S1 of the substrate 61. In this case, the first communication connector 58 is preferably biased with respect to the substrate 61 toward the same side as the side toward which the communication connector 27 is biased with respect to the main body 21.

The substrate 61 constituting the circuit substrate 60 may not be a multilayer substrate and may be a single-layer substrate. In this case, the ground layer 120 may be formed on both sides of one pair of the communication lines 116 and in a region on one face of the substrate 61 overlapping in the thickness direction of the substrate 61 with a region formed on another face of the substrate 61 where the one pair of the communication lines 116 is formed, and the one pair of the communication lines 116 may be surrounded by the ground layers 120 on three sides. Alternatively, one pair of the communication lines 116 may be formed between layers of the substrate 61 configured of a multilayer substrate, and the one pair of communication lines 116 formed between layers may be surrounded by the ground layers 120 on four sides including both sides thereof in a direction parallel to faces of the substrate 61 between which the communication lines 116 are interposed and both sides thereof in the laminate direction of the substrate.

In the above embodiment, a communication cable is not limited to a USB communication cable and may be a communication cable using other communication schemes. For example, an IEEE 1394 cable may be used. In this case, the communication connectors 27, 38, and 57 to 59 use IEEE 1394 connectors.

The shape of the connection unit 40 may be a shape that allows a plurality of image reading apparatuses to be integrally assembled. For example, the bottom plate 46 may extend frontward, and the first scanner apparatus 20 may be mounted on the bottom plate 46. While the first scanner apparatus 20 and the second apparatus 30 are respectively arranged in a lower stage and in an upper stage in the above embodiment, the upper and lower stages may be reversely arranged. The plurality of scanner apparatuses 20 and 30 may be horizontally linearly arranged in the width direction. The first image reading apparatus and the second image reading apparatus may be arranged, by using a connection unit, in a direction in which the sub-scanning directions thereof intersect (for example, are orthogonal with respect to) each other. In summary, a plurality of image reading apparatuses may be integrally connected by using a connection unit in a state respectively positioned at predetermined positions. This also applies to a case where at least one of a plurality of image formation apparatuses constituting an image formation system is a printing apparatus forming an image on a medium such as a paper by printing.

A method for fixing a plurality of image reading apparatuses to a connection unit is not limited to fastening using a fixing tool and a fastening member and may be locking that uses a locker such as a snap-fit. Fixing may not be necessarily required if image reading apparatuses can be positioned in a connection unit, and connection such as mounting image reading apparatuses on mounting positions in a state positioned by a guide unit disposed in the connection unit may be enough. For example, in the image reading system 11 in FIG. 1 and FIG. 6, the fixing tools 53 and the fastening member 54 (refer to FIG. 6) may be removed, and a guide unit that restricts a frontward (X direction) movement of the first scanner apparatus 20 may be added. This also applies to a case where at least one of a plurality of image formation apparatuses constituting an image formation system is a printing apparatus forming an image on a medium such as a paper by printing.

In the examples of FIG. 13 and FIG. 14, voltages that can be output from the power source output connectors 56 and 131 may be different from each other. For example, if a drive voltage of the first scanner apparatus 20 is different from that of the second scanner apparatus 30, the output voltages of the power source output connectors 56 and 131 may be different from each other according to the drive voltages. For example, a third step down circuit (not illustrated) is disposed midway of at least one of the power source lines 111 and 117, and different power is supplied to each of the power source output connectors 56 and 131. In this case, the power source lines 111 and 117 and the third step down circuit constitute an example of "power divider".

An image reading system may be configured by docking a plurality of the first flatbed image reading apparatuses using a connection unit. Alternatively, an image reading system may be configured by docking a plurality of the second sheet-fed image reading apparatuses using a connection unit.

Further alternatively, an image reading system may be configured by docking a plurality of the first flatbed image reading apparatuses and one second sheet-fed image reading apparatus using a connection unit or by docking one first flatbed image reading apparatus and a plurality of the second sheet-fed image reading apparatuses using a connection unit. Alternatively, an image reading system may be configured by docking a plurality of the first flatbed image reading apparatuses and a plurality of the second sheet-fed image reading apparatuses using a connection unit.

An image reading system may be configured by docking the first flatbed image reading apparatus and N (where N is a natural number greater than or equal to three) image formation apparatuses including the second sheet-fed image reading apparatus using a connection unit. In this case, the remaining image formation apparatuses of the N image formation apparatuses excluding the first image reading apparatus and the second image reading apparatus may be image formation apparatuses other than image reading apparatuses. The image formation apparatus other than an image reading apparatus can be exemplified by a printing apparatus (printer or multifunction printer) forming an image on a medium such as a paper by printing.

An image formation system can also be configured by connecting a plurality of printing apparatuses using a connection unit.

A plurality of image formation apparatuses to which power is divided and supplied by the substrate 60 of the connection unit 40, which is an example of a docking unit, is not limited to the first scanner apparatus 20 and the second scanner apparatus 30. For example, power may be divided and supplied to a plurality of the first scanner apparatuses 20 or to a plurality of the second scanner apparatuses 30. In this case, it is preferable to integrally assemble the plurality of scanner apparatuses by arranging the scanner apparatuses horizontally linearly. The plurality of image formation apparatuses to which power is divided and supplied may be a combination of a scanner apparatus and a printer. The plurality of image formation apparatuses to which power is divided and supplied may be a plurality of printers.

The entire disclosure of Japanese Patent Application No. 2015-050050, filed Mar. 12, 2015 is expressly incorporated by reference herein.

What is claimed is:

1. An image reading system in which a plurality of image reading apparatuses is connected by a connection unit, the system comprising:
    the plurality of image reading apparatuses; and
    the connection unit,
    wherein the connection unit includes:
        a power receiver to which power is input,
        a power divider that divides power input from the power receiver into plural types of power, and
        a plurality of power outputters that outputs each power divided by the power divider to the plurality of image reading apparatuses,
    wherein the plurality of power outputters includes a first power outputter and a second power outputter,
    the first power outputter includes a first connector that is configured of either a communication connector having a power supply function or a power source output connector, and
    the second power outputter includes a second connector that is configured of either a communication connector having a power supply function or a power source output connector.

2. The image reading system according to claim 1, wherein the power receiver receives power through a power source adapter that converts an alternating current input from a power source into a direct current and outputs the direct current.

3. The image reading system according to claim 1, wherein the first connector is a communication connector, and
the second connector is a power source output connector.

4. The image reading system according to claim 3, wherein the first connector is a first communication connector that is connected to a first image reading apparatus through a communication cable, and
the connection unit includes
    a host communication connector that is communicably connectable to a host apparatus,
    the first communication connector, and
    a second communication connector that is connected through a communication cable to a second image reading apparatus to which the power source output connector is connected through a power source cable.

5. The image reading system according to claim 4, wherein the first communication connector supplies power of a predetermined value or more to a unit connected thereto, and
the second communication connector supplies power less than the predetermined value to a unit connected thereto.

6. The image reading system according to claim 5, wherein a substrate constituting a circuit substrate is arranged in the connection unit at a position lined up with the first image reading apparatus in a direction intersecting a height direction of the first image reading apparatus attached to the connection unit and is arranged in a direction in which a mounting face thereof intersects the height direction,
the substrate has a predetermined plate shape surrounded by a plurality of sides, the second communication connector is arranged on a first side that is positioned on an opposite side of the substrate from the first image reading apparatus, and the first communication connector is arranged on a second side that intersects the first side in the substrate and arranged in a direction in which a direction of connection thereto intersects a direction of connection to the second communication connector.

7. The image reading system according to claim 6, wherein the power outputter connected to the second image reading apparatus through a power source cable and the second communication connector connected to the second image reading apparatus through a communication cable are adjacently arranged in the connection unit.

8. The image reading system according to claim 7, wherein the plurality of image reading apparatuses includes a flatbed image reading apparatus and a sheet-fed image reading apparatus.

9. A connection unit for the image reading system according to claim 8, the unit comprising:

a docking unit to which a plurality of image reading apparatuses is attached;

a power receiver to which power is input;

a power divider that divides power input from the power receiver into plural types; and a plurality of power outputters that outputs each power divided by the power divider to the plurality of image reading apparatuses.

10. The image reading system according to claim 1, wherein the first connector is a power source output connector, and the second connector is a power source output connector.

11. The image reading system according to claim 10, wherein the connection unit includes a circuit substrate, a power source connector group of a power source system including each connector of the power receiver and the power outputter and a communication connector group of a communication system are arranged as separate groups in a substrate constituting the circuit substrate, and each power source line connected to the power source connectors and to the communication connectors and each communication line connected to the communication connectors are arranged along non-intersecting paths in the substrate.

12. The image reading system according to claim 11, wherein a step down circuit that steps down a power source voltage input from a power source input connector of the power source connectors to a predetermined voltage and outputs the stepped down voltage to two or more communication connectors to which the plurality of image reading apparatuses is connected and a communication controller circuit that controls communication performed through the communication connectors are mounted in the substrate constituting the circuit substrate.

13. The image reading system according to claim 12, wherein two power source lines that connect output terminals of the step down circuit and two communication connectors positioned at both ends of the communication connector group and a plurality of communication lines that connects the communication controller circuit and the communication connector group are arranged in the substrate, and the two power source lines extending from the step down circuit are arranged along paths that surround the communication controller circuit and the plurality of communication lines on at least two sides.

14. The image reading system according to claim 13, wherein the communication lines are formed in the substrate along wiring paths that are surrounded by a ground layer formed in the substrate on at least three sides.

15. An image reading system comprising:

a plurality of image reading apparatuses that include a first scanner apparatus and a second scanner apparatus; and a connection unit, wherein the first scanner apparatus is attached to the connection unit in a state where a part of the first scanner apparatus is inserted into the connection unit, wherein the second scanner apparatus is attached to the connection unit in a state mounted on the connection unit, wherein the connection unit connects electrically between the first scanner apparatus and the second scanner apparatus when the first scanner apparatus and the second scanner apparatus are docked, and the connection unit includes:

a power receiver to which power is input, a power divider that divides power input from the power receiver into plural types of power, and a plurality of power outputters that outputs each power divided by the power divider to the plurality of image reading apparatuses.

* * * * *